US012367600B2

(12) United States Patent
Peterson et al.

(10) Patent No.: US 12,367,600 B2
(45) Date of Patent: Jul. 22, 2025

(54) METHODS AND SYSTEMS FOR REPRESENTING A USER

(71) Applicant: Tam Technologies, Inc., New York, NY (US)

(72) Inventors: Margaret H. Peterson, Dublin, CA (US); Young Ha Yoo, Berkeley, CA (US)

(73) Assignee: Tam Technologies, Inc., New York, NY (US)

( * ) Notice: Subject to any disclaimer, the term of this patent is extended or adjusted under 35 U.S.C. 154(b) by 0 days.

(21) Appl. No.: 17/918,797

(22) PCT Filed: May 9, 2022

(86) PCT No.: PCT/US2022/028328
§ 371 (c)(1),
(2) Date: Oct. 13, 2022

(87) PCT Pub. No.: WO2022/240745
PCT Pub. Date: Nov. 17, 2022

(65) Prior Publication Data
US 2024/0013415 A1    Jan. 11, 2024

Related U.S. Application Data

(60) Provisional application No. 63/187,157, filed on May 11, 2021.

(51) Int. Cl.
*G06T 7/55* (2017.01)
*G06T 7/33* (2017.01)
(Continued)

(52) U.S. Cl.
CPC ............... *G06T 7/55* (2017.01); *G06T 7/33* (2017.01); *G06T 7/73* (2017.01); *G06T 17/20* (2013.01);
(Continued)

(58) Field of Classification Search
None
See application file for complete search history.

(56) References Cited

U.S. PATENT DOCUMENTS 10,621,788 B1 *   4/2020  Ni .......................... G06T 7/337
2015/0154453 A1 *  6/2015  Wilf ....................... G06T 7/564
                                                         382/103
(Continued)

FOREIGN PATENT DOCUMENTS

CN    105046746 A  * 11/2015
GB       2389500 A  * 12/2003  ............. G06T 17/00

OTHER PUBLICATIONS

Kadlecek et al., "Building Accurate Physics-based Face Models from Data", Proc. ACM Comput. Graph. Interact. Tech., vol. 2, No. 2, Article 15, Jul. 2019 (Year: 2019).*
(Continued)

*Primary Examiner* — Yingchun He
(74) *Attorney, Agent, or Firm* — DeWitt LLP

(57) ABSTRACT

Depth images acquired during a scan of one or more portions of a user's body may be used to determine a full-body three-dimensional (3D) representation of the user. Depth imaging data may be used to determine the full-body shape and contours of the user when rotating in front of a user device. Machine learning methods for pose detection may be used to determine the portion of the user's body being scanned, as well as the position and pose of the user's body. A point cloud alignment process that leverages knowledge of user behavior during the scan is used to determine parameters for a full-body representation of a user, which may be based on a plurality of partial scans of the user's body. A full-body representation of a user may be output and/or displayed along with accurate measurements determined for various portions of the user's body.

22 Claims, 18 Drawing Sheets

(51) Int. Cl.
  *G06T 7/73* (2017.01)
  *G06T 17/20* (2006.01)
(52) U.S. Cl.
  CPC .............. *G06T 2200/04* (2013.01); *G06T 2207/10028* (2013.01); *G06T 2207/20081* (2013.01); *G06T 2207/30196* (2013.01); *G06T 2210/56* (2013.01)

(56) References Cited

U.S. PATENT DOCUMENTS

| | | | |
|---|---|---|---|
| 2015/0257682 A1* | 9/2015 | Hansen | A61B 5/1121 382/103 |
| 2016/0155236 A1* | 6/2016 | Davey | G06T 15/08 382/131 |
| 2017/0076487 A1* | 3/2017 | Moore | A61B 5/1079 |
| 2017/0273639 A1 | 9/2017 | Iscoe et al. | |
| 2017/0330375 A1* | 11/2017 | Chen | G06T 7/75 |
| 2018/0039745 A1* | 2/2018 | Chevalier | G16H 30/40 |
| 2019/0357615 A1 | 11/2019 | Koh et al. | |
| 2020/0257266 A1* | 8/2020 | Hargovan | G06T 19/20 |
| 2021/0019425 A1* | 1/2021 | Ostadzadeh | H04W 12/00 |
| 2021/0211825 A1* | 7/2021 | Joyner | H04S 1/002 |
| 2021/0366205 A1* | 11/2021 | Juppe | G06T 19/006 |

OTHER PUBLICATIONS

Fit3d, "3D Body Scanning—Postural Assemssment Software (PAS)—Fit3D", Jul. 5, 2019 (Year: 2019).*
Bartol et al., "A Review of Body Measurement Using 3D Scanning", IEEE Access Digital Object Identifier 10.1109/ACCESS Apr. 2021 (Year: 2021).*
Proto Tech Solutions, "3D Measure Up Web Application—Made to Measure", Oct. 21, 2020 (Year: 2020).*
Spurek et al. "Clustering of Gaussian distributions," 2016 International Joint Conference on Neural Networks (IJCNN), Vancouver, BC, Canada, 2016, pp. 3346-3353, doi: 10.1109/IJCNN.2016.772762 (Year: 2016).*
Lu et al. "Automated anthropometric data collection using 3D whole body scanners", Expert Systems with Applications 35 (2008) 407-414) (Year: 2008).*

* cited by examiner

BEFORE CLEANUP

METHODS AND SYSTEMS FOR REPRESENTING A USER

CROSS REFERENCE TO RELATED APPLICATIONS

This application is a national phase filing under 35 U.S.C. § 371 of International Application No. PCT/US2022/028328, filed May 9, 2022, which claims priority to and the benefit of U.S. Provisional Patent Application No. 63/187,157, filed May 11, 2021, the entireties of which are hereby incorporated by reference therein.

BACKGROUND

Three-dimensional (3D) modeling routinely requires an RGB camera to scan a subject to determine silhouette images or to perform landmark detection to identify portions of the scanned subject for 3D reconstruction. Traditional body scanning techniques for 3D modeling include the use of color photo images (e.g., images capture via an RGB camera) to perform silhouette extraction and/or landmark detection to estimate a user's body shape/size to generate the 3D model, or the use of depth sensors to scan a room or object by collecting high-resolution point cloud data and running 3D registration (e.g. alignment) and reconstruction processes on them. Traditional body scanning techniques for 3D modeling, as described, are difficult to perform on human subjects using, for example, a smartphone, due to inaccurate estimation of camera pose and the minimal features of a human body. 3D reconstruction requires the alignment of point cloud fragments based on knowledge of a camera pose as the camera moves through a static scene and/or requires feature detection for global alignment. 3D modeling techniques unhindered by such requirements are needed.

SUMMARY

It is to be understood that both the following general description and the following detailed description are exemplary and explanatory only and are not restrictive. Methods and systems for representing a user are described.

An imaging system may be used to partially scan a user's body, for example, as the user rotates in the field of view of a user device (e.g., a mobile device, a smart device, an image capturing device, a computing device, etc.), and generate a three-dimensional (3D) representation that accurately captures the full shape and contours of the user's body. In an alternative embodiment, the user may adhere to guided instructions from the user device so that the user device may capture scan data for an individual appendage, or sub-section, of the user's body (e.g., torso, head, leg(s) and/or arm(s)). The scan data may be used to generate a 3D representation of the scanned portion of the user's body. The scan data may also be fitted to a parametric full-body model that may be used to generate a 3D representation of the user's complete body shape and size from a partial body scan. The user device may be configured with one or more imaging sensors (e.g., cameras, depth sensors, 3D imaging devices, etc.) that may be used to determine, for example, depth images of the user. For example, the user device may be placed upright on a level surface with the one or more imaging sensors facing the user such that the user is within a field-of-view of the user device. The user may rotate, for example, rotate 360 degrees about a fixed axis, in front of the user device as the user device captures depth images of the user at various viewpoints. The depth images may be converted to a plurality of data sets, such as a plurality of 3D point clouds. The plurality of datasets may be aligned, cleaned up, and converted to a 3D model of the user's body. Body measurements may be extracted from the 3D model and displayed via an interactive interface. Additionally, in the instance wherein multiple depth images are captured correspondent to individual body parts of the user, the 3D model may be aligned with an avatar constrained by user inputted parameters (e.g., height, weight, etc.) so that a more accurate 3D model may be derived. In the instance wherein multiple sub-sections of the same user are captured in separate scans, the 3D model may be generated based on associated scan inputs of the multiple sub-sections, so that the 3D model may more accurately represent a greater portion of the user's body than was captured in a single scan. In an aspect, the 3D model may be generated based on associated scan inputs of the multiple sub-sections, so that the 3D model may more accurately represent the entirety of the user's body.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the methods and systems.

DETAILED DESCRIPTION

Figure 1:
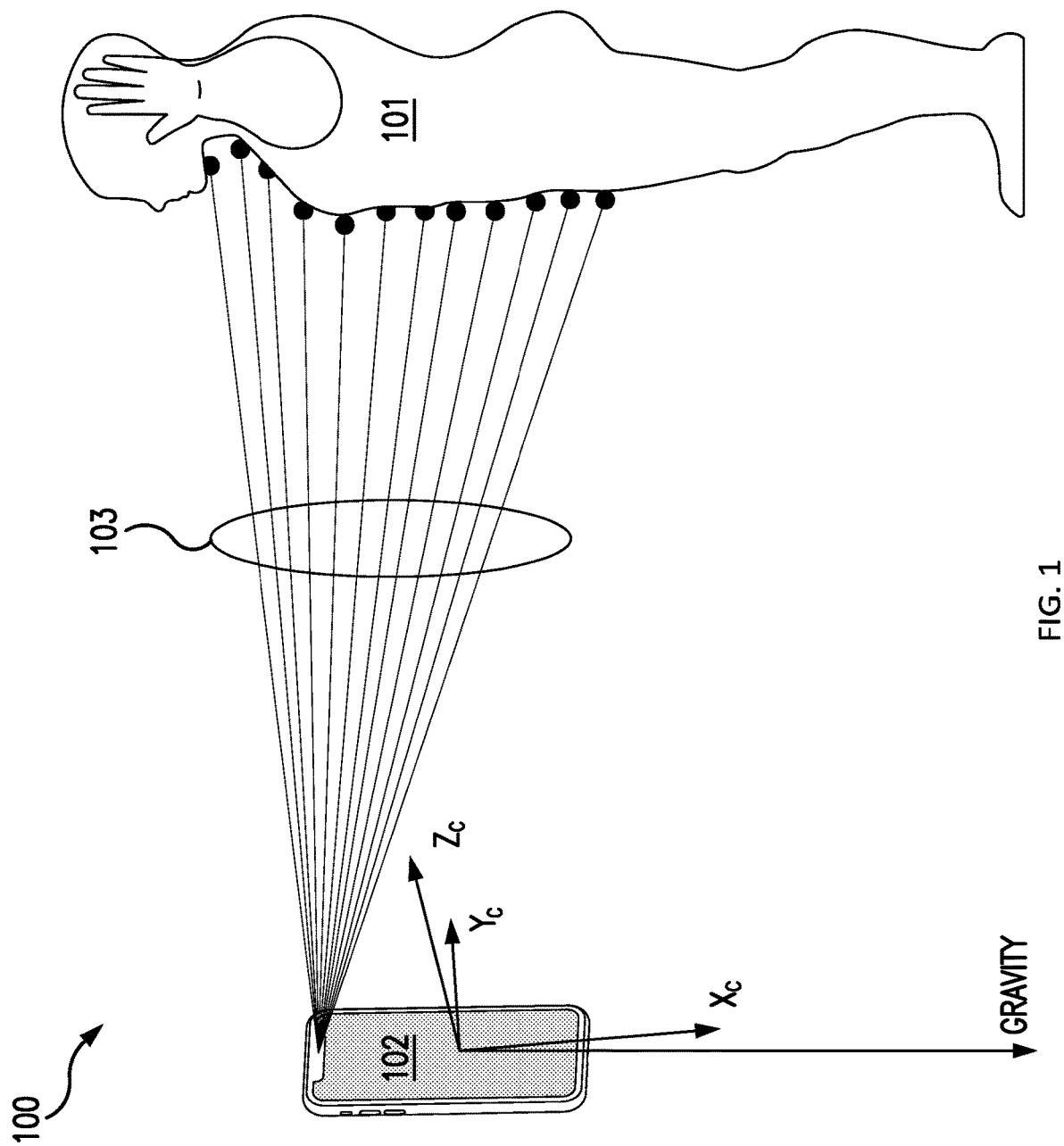
FIG. 1 shows an example system for representing a user.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers, or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof Throughout this application, reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

An imaging system may be used to partially scan a user's body, for example, as the user rotates in the field of view of a user device (e.g., a mobile device, a smart device, an image capturing device, a computing device, etc.), and generate a three-dimensional (3D) representation that accurately captures the full shape and contours of the user's body. The user device may be configured with one or more imaging sensors (e.g., cameras, depth sensors, 3D imaging devices, etc.) that may be used to determine, for example, depth images of the user. For example, the user device may be placed upright on a level surface with one or more imaging sensors facing the user such that the user is within a field-of-view of the user device. The user may rotate, for example, rotate 360 degrees about a fixed point/axis, in front of the user device as the user device captures depth images of the user at scheduled intervals. The depth images may indicate various viewpoints of the user in a constant pose (e.g., the user may rotate in place while constantly holding their arms outward from the body, the user may rotate in place while constantly holding their arms outward from the body at an angle, the user may rotate in place while constantly holding their arms upward from the body, etc.).

The depth images may be converted to a plurality of data sets, such as a plurality of 3D point clouds. The plurality of datasets may be aligned, for example, using coarse and/or fine alignment processes, based on information indicative of the user's behavior (e.g., rotating in a constant pose, etc.) when the depth images are acquired (e.g., during a scanning process, etc.). The aligned plurality of datasets (e.g., 3D point clouds, etc.) may be processed (e.g., cleaned) to remove any erroneous (e.g., noise, outliers, etc.) data points, such as data points indicative of locations away from a true surface of the user's body. The plurality of data sets, once aligned and processed (e.g., cleaned) to remove any erroneous data points, may be used to determine/generate a 3D model of the user's body. Body measurements may be extracted from the 3D model and displayed via an interactive interface.

Body measurements output by the imaging system may be integrated into 3D computer-aided design (CAD) fashion applications/software for the design, fitting, and/or presentation of clothing/garments/apparel. For e-commerce and/or shopping arrangements, outputs from the imaging system may be used, for example, to recommend sizing to users/customers and/or simulate clothing (e.g., virtual fitting, etc.) on a user's body. Outputs from the imaging system (e.g., 3D body/pose representations, user body measurements, etc.) may be used, for example, for pattern generation for garment construction. Outputs from the imaging system may be used in a wide variety of applications including: tracking a user's body shape and/or fitness over time; rigged and animated for simulation and visualization of bodies in motion and varying poses; gaming and animation applications; establishment of fit standards for a brand's target demographic, to aid a predictive model and/or recommendations engine to match users with garments/brands that are most likely to fit their body type and/or measurements. Outputs from the imaging system may be used for any application.

FIG. 1 shows an example system 100 for representing a user. The system 100 may use hardware (e.g., one or more devices), software (e.g., one or more applications, etc.), and/or a combination of hardware and software to represent a user. The system 100 may generate a three-dimensional (3D) representation of a user 101 that includes and/or associates measurements for each portion of the user 101 (e.g., the full-body of the user 101, etc.) based upon scanning a portion (e.g., a torso area, arms, legs, etc.) of the user 101. For example, as the user rotates in the field of view of a user device 102 (e.g., a mobile device, a smart device, an image capturing device, a computing device, etc.), the system 100 may generate a 3D representation/avatar that accurately captures the full shape and contours of the user's body based on the scanned portion of the user 101. In an alternative embodiment, the user 101 may adhere to guided instructions from the user device 102 so that the user device 102 may capture scan data for an individual appendage or sub-section of the user's 101 body (e.g., torso, head, leg(s) and/or arm(s)), for example. This data may be used to generate a 3D representation of the scanned portion of the user's 101 body or fitted to a parametric full-body model to generate a 3D representation of the user's 101 complete body shape and size from a partial body scan.

In an aspect, the system 100 may guide the user 101 towards an optimal position within a predetermined set of boundaries of the user device 102, for example a frame disposed on a screen of the user device 102. However, it is understood that the set of boundaries may dynamically update based upon the size of the screen of the user device 102, the orientation of the user device 102, functional limitations of the user device 102, or dimensions of the user's 101 body, for example. The system 100 may employ the use of various machine learning techniques so that the system 100 may estimate one or more joint coordinates of a plurality of joint coordinates as a functionality of a pose detection modeling aspect of the system 100. For example, the estimation of each of the joint coordinates may be based on streamed images from the user device 102 (e.g., a front-facing camera of the user device 102, etc.). The user device 102 may check, at the onset of the scan, whether the portion of the user 101 intended to be scanned is positioned within the set of boundaries of the user device 102. The estimated joint coordinates may be displayed to the user on over-top of the streamed images from the user device 102. Real-time feedback in the form of a prompt (e.g., an error message/indicator or success message/indicator) may be provided to communicate to the user 101 when the user 101 is positioned correctly in front of the camera of the user device 102. This may include detecting whether each joint coordinate is within the specified boundaries for that particular type of joint depending on the portion of the body being scanned (e.g. hip joints within a boundary region at the top of the screen for scanning legs of the user).

The user device 102 determines depth image data (e.g., capture depth images and/or snapshots, etc.) associated with the user 101 at scheduled timer intervals, for example, as the user 101 rotates 360 degrees in front of the user device 102 while holding a constant pose (e.g. a T-pose, an A-pose, etc.). As indicated at 103, the depth image data may be associated with one or more portions of a user's 101 body within field-of-view of the user device 102, such as a torso/trunk and portions of the appendages of the user 101. The depth image data may also be associated with other body parts of the user's 101 body that may be the focal point of the field-of-view not specifically indicated at 103, for example the user's 101 leg(s) and/or arm(s). For example, the user device 102, may determine a plurality of datasets (e.g., 2D joint coordinates, 3D point clouds, etc.) for each portion of one or more portions of the body of the user 101. In an aspect, a set of estimated joint coordinates may be determined for each depth image that is captured. It is understood that the captured image may also be a standard image, wherein the image may represent a planar depiction of the user 101 (e.g., a 2D image of the user 101). The plurality of joint coordinates associated with the planar depiction of the user 101 may be converted to a 3D rendition of the plurality of joint coordinates associated with the planar depiction of the user 101, using a depth map. The 3D rendition of the plurality of joint coordinates may allow for the user device 102 to identify which body part of the user 101 the related joint coordinate of the plurality of joint coordinates may represent, specifically. It is understood that a Machine Learning model, as is further discussed, may identify a joint coordinate associated with a specific joint of the user 101 (e.g., a right elbow corresponds to a specific joint coordinate, at "x, y, z"). In an aspect, joints of the user 101 may be labeled upon the start of the scan by the user device 102, which may allow for the user device 102 to determine that the set of joints that are in view of the user device 102 for a particular scan may be the intended set of joints corresponding to the portion of the body the user 101 may wish to scan. The 3D rendition of the plurality of joint coordinates may also allow for the user device 102 to determine an angle of rotation so that the user device 102 may further determine at which orientation the user 101 is facing at any given time throughout the scan. Furthermore, based on the 3D rendition of the plurality of joint coordinates, the user device 102 may determine whether the user's 101 body is correctly held in the constant pose. For example, an angle between a shoulder joint and an elbow joint may allow for the user device 102 to detect whether the user's 101 arms are correctly held in the constant pose. While the user 101 rotates 360 degrees in front of the user device 102, the user device 102 may provide real-time guidance to the user 101, so that the user device 102 may ensure that each of the joint coordinates of the plurality of joint coordinates may be within the boundaries set for the particular joint being scanned by the user device 102, throughout the user's 101 entire rotation. For example, boundaries for a particular joint may vary depending on the desired portion of the body to be scanned, placement of the device, position of the user 101, or the like. For example, the user device 102 may provide real-time guidance to the user 101, so that the user device 102 may ensure that particular joints are within a boundary region of the user device 102. For example, the boundary regions may be different for different joints of the user 101 that are scanned. For example, during a scan of the user's 101 torso, the user device 102 may require the user's 101 shoulder joints to be located within a boundary region at the top of the camera image from the user device 102 and the hip joints of the user 101 to be located within a boundary region at the bottom of the camera image from the user device 102 before the scan is to begin, or re-start. For example, the user device 102 may provide real-time guidance (e.g., feedback) to the user 101. It is understood that the feedback may be based on one or more of a rotation rate, a pose, positioning of the user's 101 body, a start time of the scan, or an end time of the scan. For example, the user device 102 may continuously monitor the angles of rotation associated with each of the joint coordinates of the plurality of joint coordinates so that the user device 102 may ensure that each of the joint coordinates of the plurality of joint coordinates may be within the joint's boundaries on the user device 102 throughout the user's 101 entire rotation. For example, in the case wherein one or more joint coordinates of the plurality of joint coordinates may fall outside the specified joint boundaries on the user device 102, the user device 102 may provide a prompt (e.g., an error message/indicator or success message/indicator) to the user 101, indicating to the user 101 to correct their pose. In another example, the user 101 may receive the prompt that may indicate to the user 101 that the user 101 should either move closer, relative to the user device 102, or move farther away, relative to the user device 102, so that the plurality of joint coordinates may be within the boundaries of the user device 102. As a further example, in the case wherein the user 101 is not rotating at the expected pace, the user device 102 may provide the prompt, indicating to the user 101 that the user 101 should correct their pace of rotation. In an aspect, the scan may not start until each of the joint coordinates of the plurality of joint coordinates are determined to be located within the boundaries of the user device 102 that may be specified for a particular joint of the user 101. In an aspect, the scan may begin (e.g., automatically) in the instance wherein the user 101 has satisfied each of the predetermined qualifying events required for the scan to begin. For example, the predetermined qualifying events may be one or more of the user 101 (e.g., or a portion of the user's body) being located within a field of view of the user device 102 based on the determined angle of rotation of the user 101, the user 101 standing in a correct pose, the user 101 positioning oneself such that the user's 101 joint coordinates fall within the expected boundary region for each joint in the desired scan area of the user's 101 body, or the user 101 and/or user device 102 being stationary.

The user device 102 may pause the scan in the instance wherein a joint coordinate of the plurality of joint coordinates falls outside of the boundaries of the user device 102 of the particular joint of the user 101 that is being scanned. The user device 102 may restart the scan from the beginning of the rotation once the user 101 repositions the out of position joint coordinate. However, it is understood that the scan may continue from a paused portion of the scan without having to restart the scan from the beginning of the rotation of the user 101. In an aspect, the user device 102 may provide a user 101 with the prompt after the user 101 completed the rotation, which may indicate that the scan was not successful (e.g., an incomplete rotation, an over-rotation, etc.), and that the user 101 will have to restart the scan from the beginning of the rotation of the user 101.

Each of the plurality of datasets may be determined relative to the orientation and/or position of the user device 102. For example, motion sensors (e.g., accelerometers, gyroscopes, orientation sensing devices, etc.) configured with the user device 102 may be used to determine a direction of gravity relative to an imaging component (e.g., a front-facing camera of the user device 102, etc.) of the user device 102. A change in the direction of gravity relative to the imaging component of the user device 102 may indicate motion and/or movement of the user device 102. An indication of motion and/or movement of the user device 102 determined while depth images are being determined (e.g., during a scan of the user 101, etc.) may cause the process to abort and/or restart. Aborting and/or restarting a depth image capturing process may be used to ensure that gravity is constant for the determination of each dataset of the plurality of datasets (e.g., 2D joint coordinates, 3D point clouds, etc.).

Figure 2:
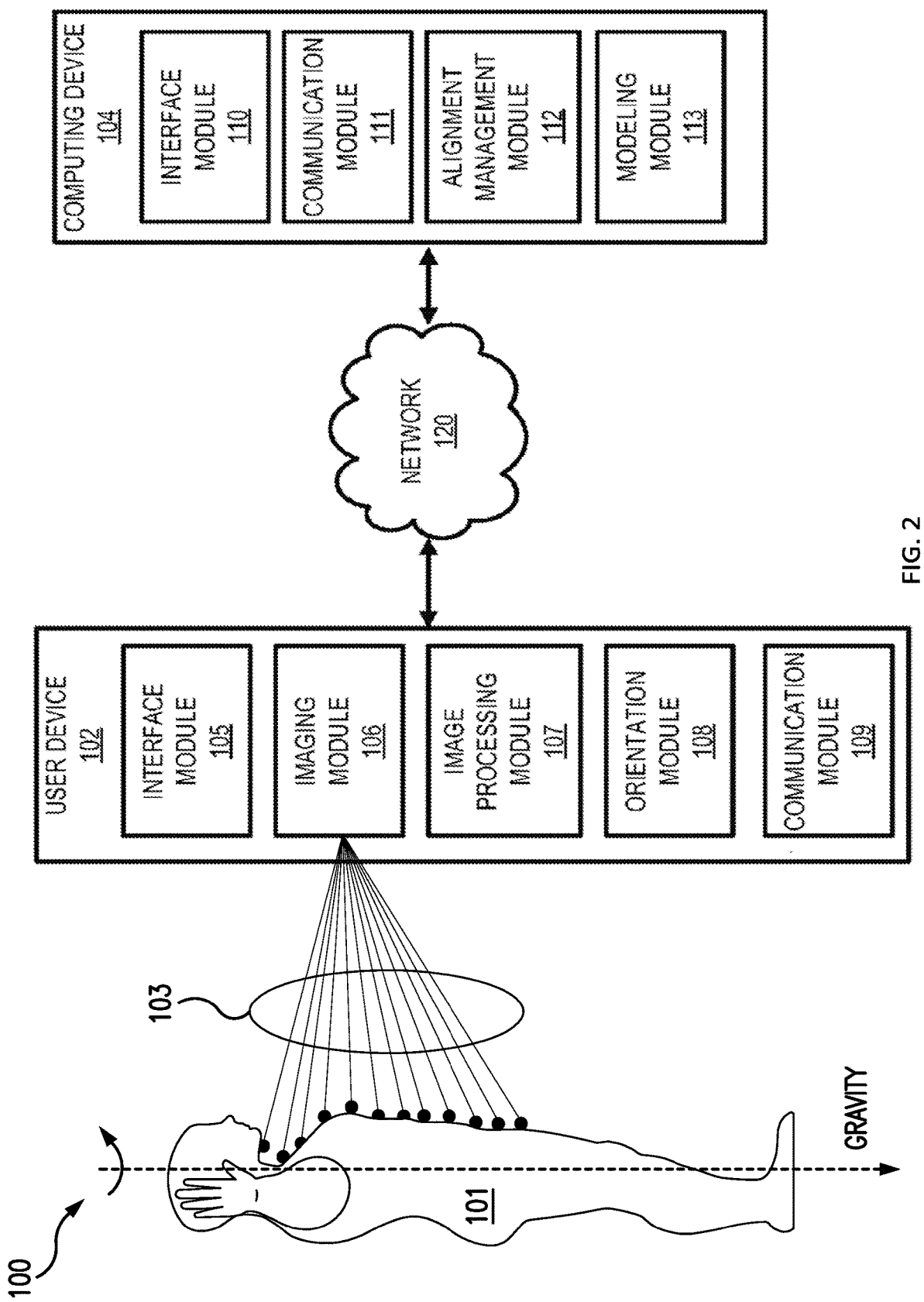
FIG. 2 shows an example system for representing a user.

FIG. 2 shows further detail of the system 100. The user device 102 may include an interface module 105. The interface module 105 may provide an interface for the user to interact with the user device 102 and/or a computing device 104 (e.g., a server, a cloud device, a network device, etc.). The interface module 105 may include one or more input devices/interfaces such as a keyboard, a pointing device (e.g., a computer mouse, remote control), a microphone, a joystick, a scanner, haptic sensing and/or tactile input devices, and/or the like.

The interface module 105 may include one or more interfaces for presenting and/or receiving information to/from the user, such as a three-dimensional (3D) representation of the user 101 that includes and/or associates measurements for each portion of the user 101 (e.g., the full-body of the user 101, torso area, arm(s), leg(s), etc.). The interface module 105 may include any software, hardware, and/or interfaces used to provide communication between the user 101 and one or more of the user device 102, the computing device 104, and/or any other component of the system 100. The interface module 105 may include one or more audio devices (e.g., stereos, speakers, microphones, etc.) for capturing/obtaining audio information and conveying audio information, such as audio information captured/obtained from the user and/or conveyed to the user. The interface module 105 may include a graphical user interface (GUI), a web browser (e.g., Internet Explorer®, Mozilla Firefox®, Google Chrome®, Safari®, or the like), an application/API. The interface module 105 may request and/or query various files from a local source and/or a remote source, such as the computing device 104 and/or any other device/component (not shown) associated with the system 101.

The interface module 105 may transmit/send data to a local or remote device/component of the system 100 such as the computing device 104 via a network 120. The network 120 may include and/or support a wide area network (e.g., a packet-switch network, Internet, etc.), a content delivery/access network, a cellular network, a satellite network, a fiber-optic network, a wired network, a wireless network, and/or the like. The network 120 may support any network path, protocol, device, and/or the like.

The user device 102 may include a communication module 109. The communication module 109 may enable the user device 102 to communicate with components of the system 100, such as the computing device 104 and/or another user device 102, via wired and/or wireless communication techniques. For example, the communication module 109 may utilize any suitable wired communication technique, such as Ethernet, coaxial cable, fiber optics, and/or the like. The communication module 109 may utilize any suitable long-range communication technique, such as Wi-Fi (IEEE 802.11), BLUETOOTH®, cellular (e.g., fourth-generation (4G) cellular technology, fifth-generation (5G) cellular technology, any-generation (XG) cellular technology, etc.), satellite, infrared, and/or the like. The communication module 109 may utilize any suitable short-range communication technique, such as BLUETOOTH®, near-field communication, infrared, and the like.

The user device 102 may include an imaging module 106. The imaging module 106 may include one or more image capturing devices, such as one or more cameras and/or depth sensors that determine/capture image data (e.g., depth images, depth maps, static/still images, dynamic/interactive images, video, etc.). For example, the imaging module 106 may capture any image data that provides a real-time and/or real-world representation of the user 101 and/or a portion of the body of the user 101. For example, the imaging module 106 may be used to capture/take a plurality of depth images and/or video of the user 101, for example, as the user 101 rotates 360 degrees in front of the user device 101 (e.g., the imaging module 106, etc.) while holding a constant pose (e.g. a T-pose, an A-pose, etc.). As indicated at 103, the depth image data associated with one or more portions of a user's 101 body within field-of-view of the user device 101, such as a torso/trunk and portions of the appendages of the user 101. It is understood, however, that the depth image data, relative to 103, may also be associated with other body parts of the user's 101 body that may be the focal point of the field-of-view not specifically indicated at 103, for example the user's 101 leg(s) and/or arm(s).

The interface module 105 may include one or more displays (e.g., monitors, liquid crystal displays, organic light-emitting diode displays, active-matrix organic light-emitting diode displays, stereo displays, etc.) for displaying/presenting information to the user 101, such as an image and/or avatar associated with the user 101, image data depicting accurate measurements (e.g., anthropometric measurements, etc.) of the user 101 and/or the placement (e.g., virtual, etc.) of one or more garments, apparel, and/or items of clothing on the user 101, and/or the like. The interface module 105 may display/present a 3D representation of the user 101.

For example, a 3D representation of the user 101 may include a generic/replicated representation of the user 101 and/or a portion of the body of the user 101, such as a generic image, a replicated image, a wired/stick image, virtual image (e.g., an avatar, etc.), a triangle mesh, texture map, skeleton structure, joint locations, skinning weights, a static model, a dynamic model, an animation, and/or video representation. A 3D representation of the user 101 may include parameters that define the body shape and size of the user 101 in a parametric model of a human body. In an embodiment, the 3D representation of the user 101 may be a static picture representation and/or static model representation of the user 101 and/or portions of the body of the user 101. In an embodiment, the 3D representation of the user 101 may be a real-time and/or dynamic representation, such as a video and/or animation, of the user 101 and/or portions of the body of the user 101.

To display a representation of the user 101, the system 100, for example, the user device 102, may determine a plurality of datasets (e.g., 3D point clouds, etc.) for each portion of one or more portions of the body of the user 101. The user device 102 may include an image processing module 107. The image processing module 107 may receive depth image data/information, for example, from the imaging module 106 and determine a plurality of datasets (e.g., 3D point clouds, etc.) for each portion of one or more portions of the body of the user 101. The plurality of datasets may be based on and/or indicative of multiple viewpoints of the user 101 (e.g., depth images and/or datasets taken as the user 101 rotates 360 degrees, etc.).

Each dataset may include one or more data points. Each data point may represent a single depth image and/or scan measurement, such as a pixel value associated with the image data. For example, the image processing module 107 may estimate a depth for each pixel value (e.g., data point, etc.) associated with image data. For example, imaging data (e.g., depth images, etc.) determined by the imaging module 106 may include two-dimensional (2D) data/information where pixel coordinates (e.g., data points, etc.), $$\begin{bmatrix} u \\ v \end{bmatrix},$$

may be represented as $[x\ y\ z]^T$ image where z=depth. The image processing module 107 may convert each depth pixel into a 3D point in frame of the imaging module 106 based on, for example, an intrinsic matrix. For example:

$$[x\ y\ z]^T_{image} = K_{camera} [x\ y\ z]^T_{camera}$$

where K represents the intrinsic matrix of the imaging module 106 (e.g., camera, etc.).

$$K = \begin{bmatrix} f_x & 0 & p_x \\ 0 & f_y & p_y \\ 0 & 0 & 1 \end{bmatrix}$$

where $f_x$ and $f_y$ represent the focal lengths of the imaging module 106, and $p_x$ and $p_y$ represent a principal point that equates to the origin of an image plane with respect to the camera (e.g., the imaging module 106, etc.).

As described, each data point of each dataset of the plurality of datasets (e.g., 3D point clouds, etc.) may be stitched together to generate a complete capture/representation of the user 101 via a registration process that merges multiple datasets into a globally consistent model (or coordinate frame) and maps each scanned data point to a known dataset to estimate a pose of the user 101.

The plurality of datasets may also include datasets determined while the user 101 is not rotating and/or is in a stationary position. For example, determination and/or capture of the depth image may be initiated and ended with the user 101 standing in a stationary standing pose facing the imaging module 106.

The datasets determined while the user 101 is not rotating and/or is in a stationary position may be used to estimate the pose of the user 101. The image processing module 107 may include computer vision, a trained machine learning model, a predictive model, and/or the like configured to estimate a pose of the user 101.

Figure 3:
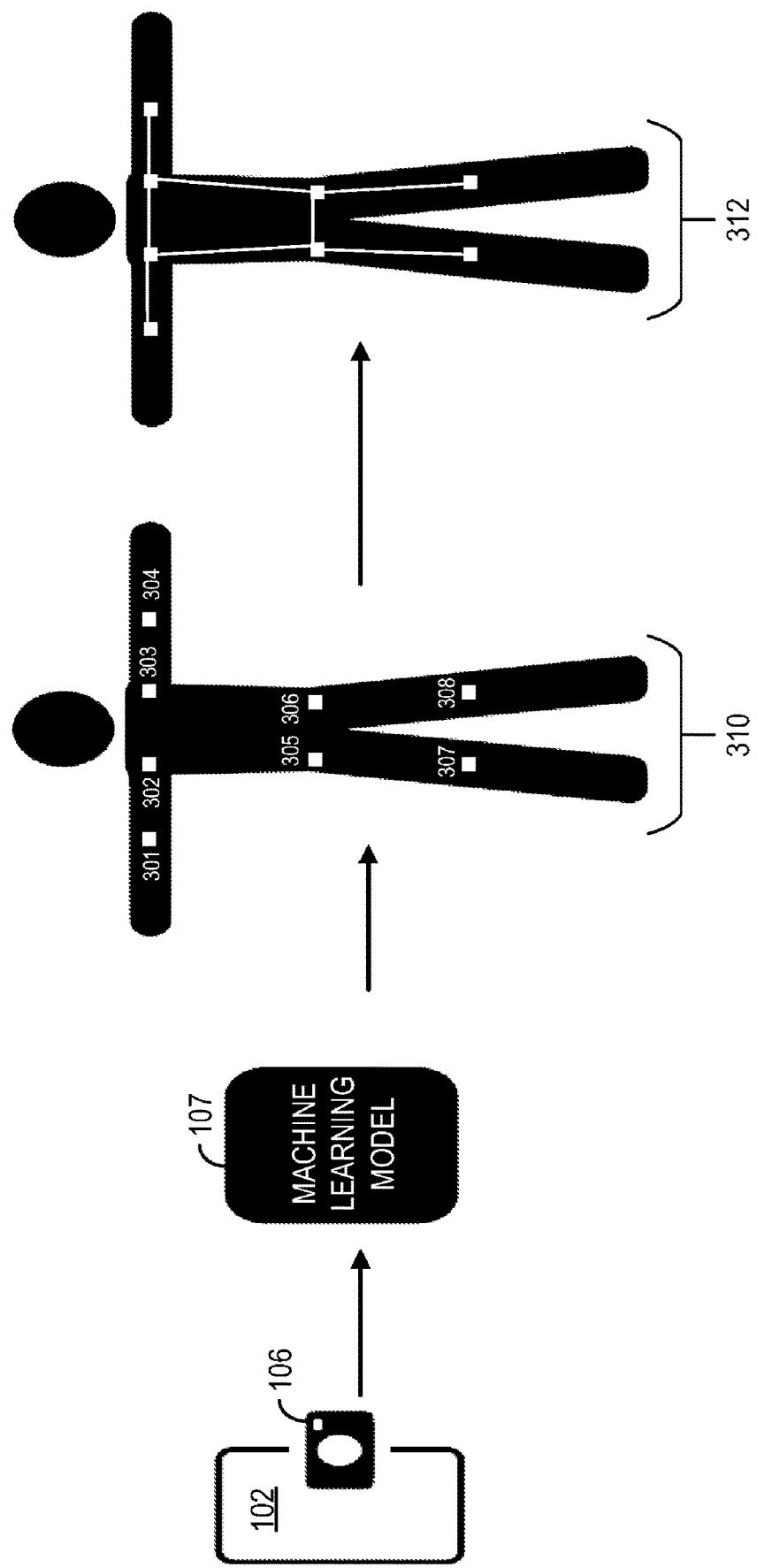
FIG. 3 shows an example of pose estimation.

FIG. 3 shows an example of pose estimation/detection by the system 100. The image processing module 107 may be used to estimate joint locations (e.g., shoulders, elbows, hips, knees, etc.) of the user 101 in a depth image of the depth image data (and/or color image data). For example, in the instance wherein a user's 101 legs are scanned, the detection of the disposition of the user's 101 hips, knees, and ankles may be automated based on the plurality of joint coordinates and/or the point clouds collected from the scan of the user 101. In an aspect, detection of the disposition of the user's 101 hips, knees, and ankles may be automated based on the plurality of joint coordinates and/or the point clouds determined from an image as well. For example, the user device 102 may generate the image of the user 101 via the camera of the user device 102. The image processing module 107 may use computer vision, a trained machine learning model, a predictive model, and/or the like to determine locations of the joints (e.g., portions, etc.) of the user 101 from the depth and/or color image data. For example, color images such as RGB images may include color values for each pixel, and depth images may include depth values at each pixel. Although depth image data is described, it should be understood that any reference to depth image data may include depth image and color image data. For example, a combination of both RGB and depth images may be used to estimate joint locations (pixel coordinates within the image), and pixel coordinates may be converted into a 3D position coordinate using an intrinsic matrix of the image processing module 107. For example, the image processing module 107 may analyze a depth and/or color image (e.g., RGB image, etc.) and determine data points (e.g., pixel coordinates, 3D position coordinates, etc.) indicative of and/or associated with joint locations of the user 101. For example, as shown at 310, data point 301 may indicate a right elbow, data point 302 may indicate a right shoulder, data point 303 may indicate a left shoulder, data point 304 may indicate a left elbow, data point 305 may indicate a right hip, data point 306 may indicate a left hip, data point 307 may indicate a left knee, and data point 308 may indicate a right knee of the user 101. The system may determine any number of data points (e.g., pixel coordinates, 3D position coordinates, etc.) indicative of and/or associated with joint locations and/or portions of the user 101. The data points 301-308 may collectively indicate a pose of the user 101. It is understood that any number of data points associated with various other parts of the user's 101 body may additionally be included in the collective indication of the pose of the user 101. It is also understood that the quantity of data points may correspond to the accuracy of the indicated pose of the user 101. For example, more data points may generate a more accurate indicated pose of the user 101 and less data points may generate a less accurate indicated pose of the user 101.

The data points 301-308 may be converted to datasets (e.g., point clouds). In an aspect, the data points 301-308 may be converted based on a partial scan correspondent to specific body parts of the user 101 relative to one or more of the data points 301-308, or any other data points. The image processing module 107 may determine/calculate angular rotation about gravity based on the stationary pose of the user 101. For example, 0 degrees may equate to the user 101 in a stationary pose facing the user device 102. An algorithm such as: armspan_v=(left_shoulder_location−right_shoulder_location). normalize( ) may be used to estimate the orientation of the appendages. The image processing module 107 may zero out components of armspan_v in the gravity direction (e.g., since it is known the user 101 is rotating about gravity, etc.). The image processing module 107 may determine/compute a cross product between armspan_v in a currently analyzed depth image (e.g., snapshot) of the depth image data and the $y_w$-axis to determine the direction of rotation to be clockwise vs counter-clockwise about gravity since it is known the user 101 is holding their arms out on either side of their body perpendicular to the direction they are facing. The image processing module 107 may determine/compute a dot product to determine the angle of rotation. To estimate a pose, the image processing module 107 may, for example, determine the data points 301-308, or any other data points, and, as shown at 312, determine/draw wireframe pose on top of them. Any method and/or algorithm may be used to determine/estimate a pose of the user 101.

Returning to FIG. 2, as described, each of the plurality of datasets (e.g., 3D point clouds, etc.) may be determined relative to the orientation and/or position of the user device 101. For example, the user device 102 may include an orientation module 108. The orientation module 108 may include one or more motion and/or orientation sensing devices, such as one or more accelerometers, gyroscopes, and/or the like. The orientation module 108 may determine a direction of gravity relative to the imaging module 106.

For example, the orientation module 108 may include at least a first orientation sensing device, such as an accelerometer and/or the like, that indicates a direction of gravity relative to the user device 102 when the user device 102 is stationary. The stationary condition of the user device 102 may be used to determine/estimate an instantaneous gravity direction. The orientation module 108 may include at least a second orientation sensing device, such as a gyroscope and/or the like, that indicates the current rotation rates of the user device 102. For example, data indicating an attitude of the user device 101 may be propagated by gyro rotation rates while the user device 102 is not stationary.

Analysis of depth images used to determine a 3D representation of the user 101 may be based on a determination of a direction of gravity determined by the orientation module 108. For example, a variation in gravity direction determined by the orientation module 108 during the collection of depth image data (e.g., during a scan of the user 101, etc.) may indicate that the user device 102 is in motion (e.g., motion is detected, etc.) and the collection of depth image data may be aborted to ensure that gravity is constant during the determination of each dataset of the plurality of dataset (e.g., 3D point clouds, etc.).

For example, the user device (e.g., the orientation module 108, etc.) may determine whether the gravity direction estimated at the beginning of the depth image data collection process corresponds to the gravity estimate at a later point during the data collection (e.g., during a scan of the user 101, etc.). For example, a match between a gravity direction determined/estimated based on data/information from the motion sensors at the beginning of the data collection and a gravity direction determine during data collection may cause the collection of depth image data associated with the user 101 to continue (e.g., cause a scan to proceed, etc.). A discrepancy (e.g., non-match, more than a threshold level of variance or discrepancy, etc.) in the gravity direction determined/estimated based on data/information from the motion-sensing devices during the data collection may indicate motion and/or movement of the user device 101. The discrepancy between the gravity direction determined/estimated based on data/information from the motion-sensing devices at the beginning of the data collection and the gravity direction determined/estimated based on data/information from the motion-sensing devices in the middle of the data collection process may cause the collection of depth image data associated with the user 101 to be aborted (e.g., cause a scan to abort/terminate, etc.).

Aborting/terminating and/or restarting a depth image collection/capturing process may be used to ensure that gravity is constant for the determination of each dataset of a plurality of datasets (e.g., 3D point clouds, etc.) used to determine a 3D representation of the user 101.

To determine a 3D representation of the user 101, a plurality of datasets (e.g., 3D point clouds, etc.) determined from depth image data during a scan of the user 101, data indicative of determined/estimated joint locations of the user 101, and an indication of a gravity direction may be sent, for example, by the user device 102, to the computing device 104 (e.g., server, cloud device, network device, etc.). The plurality of datasets may be aligned, for example, by the computing device 104 using coarse and/or fine alignment processes, based on information indicative of the behavior of the user 101 (e.g., rotating in a constant pose, etc.) when depth images are collected/captured (e.g., during a scan of the user 101, etc.). Aligned datasets (e.g., 3D point clouds, etc.) may be processed (e.g., cleaned) to remove any erroneous (e.g., noise, outliers, etc.) data points, such as data points indicative of locations away from a true surface of the body of the user 101. Aligned and processed (e.g., cleaned) datasets may be used to determine/generate a 3D representation of the user 101.

The computing device 104 may include a communication module 111 to facilitate receiving the plurality of datasets (e.g., 3D point clouds, etc.) determined from depth image data during a scan of the user 101, the data indicative of determined/estimated joint locations of the user 101, and the indication of the gravity direction from, for example, the user device 102. The communication module 111 may enable the computing device 104 to communicate with components of the system 100, such as the user device 102, via wired and/or wireless communication techniques. For example, the communication module 111 may utilize any suitable wired communication technique, such as Ethernet, coaxial cable, fiber optics, and/or the like. The communication module 111 may utilize any suitable long-range communication technique, such as Wi-Fi (IEEE 802.11), BLUETOOTH®, cellular (e.g., fourth-generation (4G) cellular technology, fifth-generation (5G) cellular technology, any-generation (XG) cellular technology, etc.), satellite, infrared, and/or the like. The communication module 111 may utilize any suitable short-range communication technique, such as BLUETOOTH®, near-field communication, infrared, and the like.

The computing device 104 may include an interface module 110. The interface module 110 may provide an interface to interact with the computing device 104 and/or the user device 102. The interface module 110 may include one or more input devices/interfaces such as a keyboard, a pointing device (e.g., a computer mouse, remote control), a microphone, a joystick, a scanner, haptic sensing and/or tactile input devices, and/or the like.

The interface module 110 may include one or more interfaces for presenting and/or receiving information to/from the user, such as a three-dimensional (3D) representation of the user 101 that includes and/or associated measurements for each portion of the user 101 (e.g., the full-body of the user 101, etc.). The interface module 110 may include any software, hardware, and/or interfaces used to provide communication between the user device 102 and/or any other device/component of the system 100. The interface module 110 may include one or more audio devices (e.g., stereos, speakers, microphones, etc.). The interface module 110 may include a graphical user interface (GUI), a web browser (e.g., Internet Explorer®, Mozilla Firefox®, Google Chrome®, Safari®, or the like), an application/API. The interface module 110 may request and/or query various files from a local source and/or a remote source, such as the computing device 104, the user device 102, and/or any other device/component (not shown) associated with the system 101.

The computing device 104 may include an alignment management module 112. The alignment management module 112 may align a plurality of datasets using coarse and/or fine alignment processes, based on information indicative of the behavior of the user 101 (e.g., rotating in a constant pose, etc.) when depth images are collected/captured (e.g., during a scan of the user 101, etc.). For example, each dataset (e.g., 3D point cloud, etc.) determined by the user device 101 only corresponds to one side of the user 101 as the user 101 rotates in front of the imaging module 106. The alignment management module 112 may use an Iterative Closest Point (ICP) registration algorithm to locally align datasets. ICP requires a good approximate initial transformation. The alignment management module 112 may determine an initial global alignment based on an indication of the behavior of the user 101 (e.g., user 101 rotating about a fixed axis and/or gravity direction at an approximately constant angular rate, etc.).

The alignment management module 112 may perform coarse alignment of a plurality of datasets by rotating each fragment/value of a dataset about gravity through an estimated center of the body of the user 101 for each depth image (e.g., snapshot, etc.). Since a collection of depth images (e.g., a scan, etc.) starts and ends with the user 101 in a stationary standing pose facing the user device 102 (the imaging module 106, etc.), the alignment management module 112 may remove stationary datasets (e.g., stationary point clouds, etc.) corresponding to depth images taken when the user 101 is stationary from the plurality of datasets determined during the collection of depth image data (e.g., a scanning process, etc.). Stationary datasets describe datasets (e.g., point clouds, etc.) that are overly similar (e.g., satisfying and/or exceeding a threshold value of similarity, etc.) to a previous dataset. The alignment management module 112 may downsample and determine/compute a distance from each data point of a dataset to the closest point in a previous dataset. The alignment management module 112 may use an algorithm and/or the like that causes the alignment management module 112 to skip a dataset (e.g., a point cloud, etc.) if, for example, the mean distance of its data points is less than a similarity threshold and the standard distance for a dataset is less than a similarity threshold for standard distances (e.g., mean_dist<similarity_mean_threshold and std_dist<similarity_std_threshold).

The alignment management module 112 may correct and/or account for a tilt of user device 102 (e.g., shown in FIG. 1, etc.) with respect to gravity by aligning the x-axis for each dataset (e.g., point cloud, etc.) with the indicated direction of gravity. It may be assumed that the user device 102 is placed on a level surface such that the y-axis of the user device 102 and/or the imaging module 106 (represented as $y_c$) is in the horizontal plane perpendicular to gravity. The alignment management module 112 may use, for example, the following algorithm when coarsely aligning datasets to determine/compute gravity tilt value: a tan 2(gravityZc, gravityXc). The alignment management module 112 may gravity align datasets in world coordinates (e.g., $x_w$, $y_w$, $z_w$, 3D Cartesian coordinates, etc.) by rotating by the gravity tilt value about the y-axis of the user device 102 (represented as $y_c$).

As described, the alignment management module 112 may coarsely align datasets based on joint and/or pose estimation data, for example, received from the user device 102 used to determine a direction of rotation. When joint and/or pose estimation data is unavailable, the alignment management module 112 may use principal component analysis to determine a direction of rotation. For example, an eigenvector associated with the largest eigenvalue determined from a plurality of datasets (e.g., 3D point clouds, etc.) based on depth image data may be used to determine a long vertical axis traversing the user 101 (e.g., an axis from head-to-toe of the user 101, etc.). An eigenvector associated with the second-largest eigenvalue determined from a plurality of datasets (e.g., 3D point clouds, etc.) based on depth image data may be used to determine a cross-axis associated with the user 101 (e.g., an arm span axis from outstretched arms of the user 101 to either side of the body of the user 101 in A-pose or T-pose during a scan). The alignment management module 112 may zero out the gravity (x-axis) component of the arm span vector and normalize the values. Resolution analysis may assume that user 101 rotates continuously and depth images (e.g., snapshots, etc.) from depth image data are sequential. Accordingly, a value determined for armspan_v direction cannot make large discontinuous jumps. The alignment management module 112 may set initial values as: prey_armspan_v=$y_w$-axis, since the scan of the user 101 starts with the user 101 facing the user device 102 (e.g., the imaging module 106, etc.). For each data point (fragment), the alignment management module 112 may choose armspan_v=+/−armspan_v by comparing against prey_armspan_v to result in the smallest jump in vector direction. The alignment management module 112 may determine/compute a cross product between armspan_v in a current depth image and/or snapshot and $y_w$-axis to determine a direction of rotation (e.g., clockwise vs counter-clockwise) of the user 101 about gravity. The alignment management module 112 may determine/compute a dot product between armspan_v and $y_w$-axis to determine an angle of rotation. The alignment management module 112 may determine/estimate an angle of rotation by assuming the user 101 rotates at a constant angular rate such that the rotation angle is determined by dividing 360 degrees by the number of depth images.

To determine a center of rotation relative to the user 101, assuming the user 101 is rotating in-place about gravity during the collection of depth image data, the alignment management module 112 may approximate a rotation axis as the gravity direction through the center of the body of the user 101. The alignment management module 112 may determine a horizontal slice through the middle of the trunk of the body of the user 101. The alignment management module 112 may determine each data point of a dataset that is within a threshold distance from the middle of the trunk (e.g., within threshold deltaX of midTrunk X value, etc.). The alignment management module 112 may cluster data points in a horizontal slice, for example, using a density-based clustering algorithm and/or the like, and remove all data points that are not in the largest cluster. The described process removes potential obstructions from a plurality of datasets, such as datasets determined when the arms of the user 101 are down by the sides of the user 101 (e.g., next to the waist, etc.). The alignment management module 112 may use, for example, least squares to fit a circle to the sliced cluster of data points. The alignment management module 112 may determine/estimate a center of rotation as the center of the circle.

Coarsely aligned datasets may be finely aligned, for example, by the alignment management module 112. As described, the alignment management module 112 may perform a coarse alignment of datasets by rotating each fragment and/or data point by its estimated eigenangle/eigenvector of rotation about the estimated center of rotation. This provides the initial alignment of datasets (e.g., point cloud fragments, etc.) in a world coordinate frame (e.g., $x_w$, $y_w$, $z_w$, etc.). The alignment management module 112 may perform a fine alignment of coarsely aligned datasets by running ICP on each pair of datasets (e.g., point cloud fragments, etc.) starting from the initial transformation provided by coarse alignment. The alignment management module 112 may execute pose graph optimization to mitigate errors in pairwise registration between each pair of datasets (e.g., point cloud fragments, etc.), and to ensure loop closure. The alignment management module 112 may use any method to align a plurality of datasets.

Figure 4:
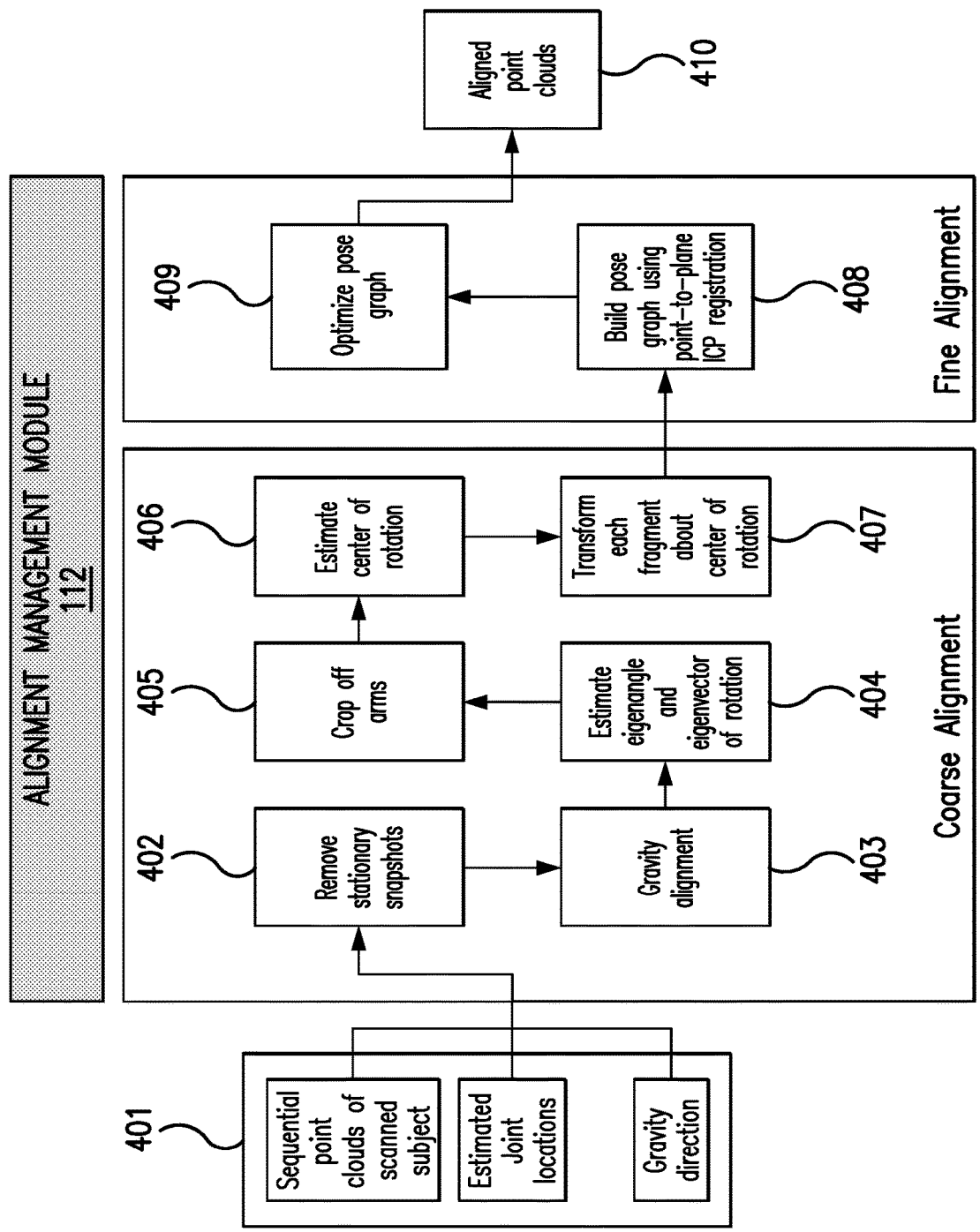
FIG. 4 shows an example alignment process.

FIG. 4 shows a block diagram of an example alignment process performed by the alignment management module 112. The alignment process may include a coarse alignment of datasets (e.g., point clouds, etc.) based on estimated user rotation parameters. The alignment process may include coarsely aligning data points, of each dataset of a plurality of datasets determined for each of one or more portions of the body of a subject (e.g., a scanned object, the user 101, etc.) by aligning the vertical axis of each dataset with a gravity direction determined, for example, by the user device 102. Coarse alignment of datasets (e.g., point clouds, etc.) may be followed by fine registration of the datasets based on minimizing the distances between corresponding data points in overlapping datasets.

For example, at 401, the alignment management module 112 may receive sequential point clouds (e.g., datasets, etc.) of a scanned object (e.g., the user 101, etc.), data indicative of estimated joint locations, and an indication of a gravity direction. At 402, the alignment management module 112 may remove stationary snapshots (e.g., depth images, etc.) from a plurality of snapshots. At 403, the alignment management module 112 may perform a gravity alignment of point clouds and, at 404, determine/estimate an eigenangle and an eigenvector of rotation. To simplify calculations, at 405, appendages (e.g., arms, etc.) of the subject (e.g., the user 101, etc.) depicted in depth image data may be cropped off. At 406, the alignment management module 112 may estimate a center of rotation relevant to the subject and, at 407, transform each fragment of each point cloud about a center of rotation to coarsely align the point clouds of the scanned object.

The alignment management module 112 may perform a fine alignment of coarsely aligned point clouds. For example, at 408, the alignment management module 112 may determine and/or build a pose graph based on point-to-plane iterative closest point (ICP) registration. At 409, the alignment management module 112 may optimize the pose graph, and, at 410, the alignment management module 112 may output/determine aligned point clouds (e.g., aligned datasets, etc.).

Returning to FIG. 2, datasets (e.g., point clouds) associated with depth image collection (e.g., a scan, etc.) of the user 101 that have been aligned may be cleaned and used to determine/generate a 3D representation (e.g., a 3D model, a 3D avatar, etc.) of the user 101. The computing device 104 may include a modeling module 113 that may determine/generate a 3D representation (e.g., a 3D model, a 3D avatar, etc.) of the user 101. The modeling module 113 may include a trained machine learning model configured to determine/generate a 3D representation (e.g., a 3D model, a 3D avatar, etc.) of the user 101. The modeling module 113 may be configured with and/or support one or more image segmentation applications and/or tools and execute functions such as object recognition, point cloud feature detection and/or extraction, and/or dataset analysis.

The modeling module 113 may combine a plurality of aligned datasets (e.g., point cloud fragments, etc.) into a single dataset (e.g., point cloud, etc.). The resultant dataset may include noise and outlier data points away from a true surface of the body of the user 101. The modeling module 113 may clean up these erroneous points by placing markers inside the trunk of the user's body and running a hidden point removal algorithm to remove any points that are not visible from those marker locations. The modeling module 113 may determine and remove erroneous data points that lie away from the surface of the user 101 indicated by depth image data. For example, automatically cropping off arms, legs, the head, and/or appendage determined to move relative to the trunk of the body of the user 101 may cause errors (e.g., scanning errors, etc.) due to the use of rigid registration of data points.

Dataset (e.g., point cloud, etc.) cleanup may include the placement of an inner marker at the center shoulder location of the user 101 indicated by the dataset. The modeling module 113 may horizontally slice the dataset by binning all data points by height along the x-axis into bins of deltaX. The modeling module 113 may determine/compute the width of each slice as the range in y-values of that slice, after removing outliers from the bin. The modeling module 113 may use a peak-finding algorithm to find the first bin with a significantly large width with respect to the rest of the bins. The modeling module 113 may estimate the respective bin's x-coordinate as the shoulder height of the user 101. The modeling module 113 may place a marker at shoulder height in the center of the dataset (e.g., shoulder_x, mid_y, mid-z).

Dataset (e.g., point cloud, etc.) cleanup may include the placement of an inner marker inside each upper leg location of the user 101 indicated by the dataset. The modeling module 113 may horizontally slice the dataset (e.g., point cloud, etc.) by binning all data points by height along the x-axis into bins of deltaX. The modeling module 113 may estimate the crotch height by determining the first bin below the shoulders with a significant number of points in the center of the horizontal slice. The modeling module 113 may place markers inside each upper leg. For example, modeling module 113 may place markers inside each upper leg such that: [crotch_x, −slice_ width[crotch_slice_i]/4, mi_z] and [crotch_x,+slice_width[crotch_slice_i]/4, mid_z]. The modeling module 113 may place a center torso marker midway between crotch_x and shoulders_x, in the center of the dataset (e.g., point cloud, etc.) at [0.5*(crotch_x+shoulders_x), mid_y, mid_z].

The modeling module 113 may execute surface reconstruction. The modeling module 113 may determine/compute dataset (e.g., point cloud, etc.) normal and propagate the normals to be consistently oriented using a minimum spanning tree algorithm to cause all normals to either point inward or outward. The modeling module 113 may determine whether normals are currently pointing inward or outward by making a dataset (e.g., point cloud, etc.) which is composed of each data point in the original dataset (e.g., point cloud, etc.) displaced by a small delta in the direction of the estimated normal direction at that point. The modeling module 113 may compare the resulting bounds to determine whether the dataset (e.g., point cloud, etc.) has shrunk or expanded. If normals are currently pointing inward, the modeling module 113 may flip all normals to point in the opposite direction. The modeling module 113 may, for example, perform Poisson surface reconstruction to generate a triangle mesh of the surface. The modeling module 113 may, for example, perform Taubin smoothing to smooth the generated mesh. The modeling module 113 may output a body model of the user 101, for example, as a triangle mesh and/or any other representation of the user 101, such as a full-body 3D avatar.

Figure 5:
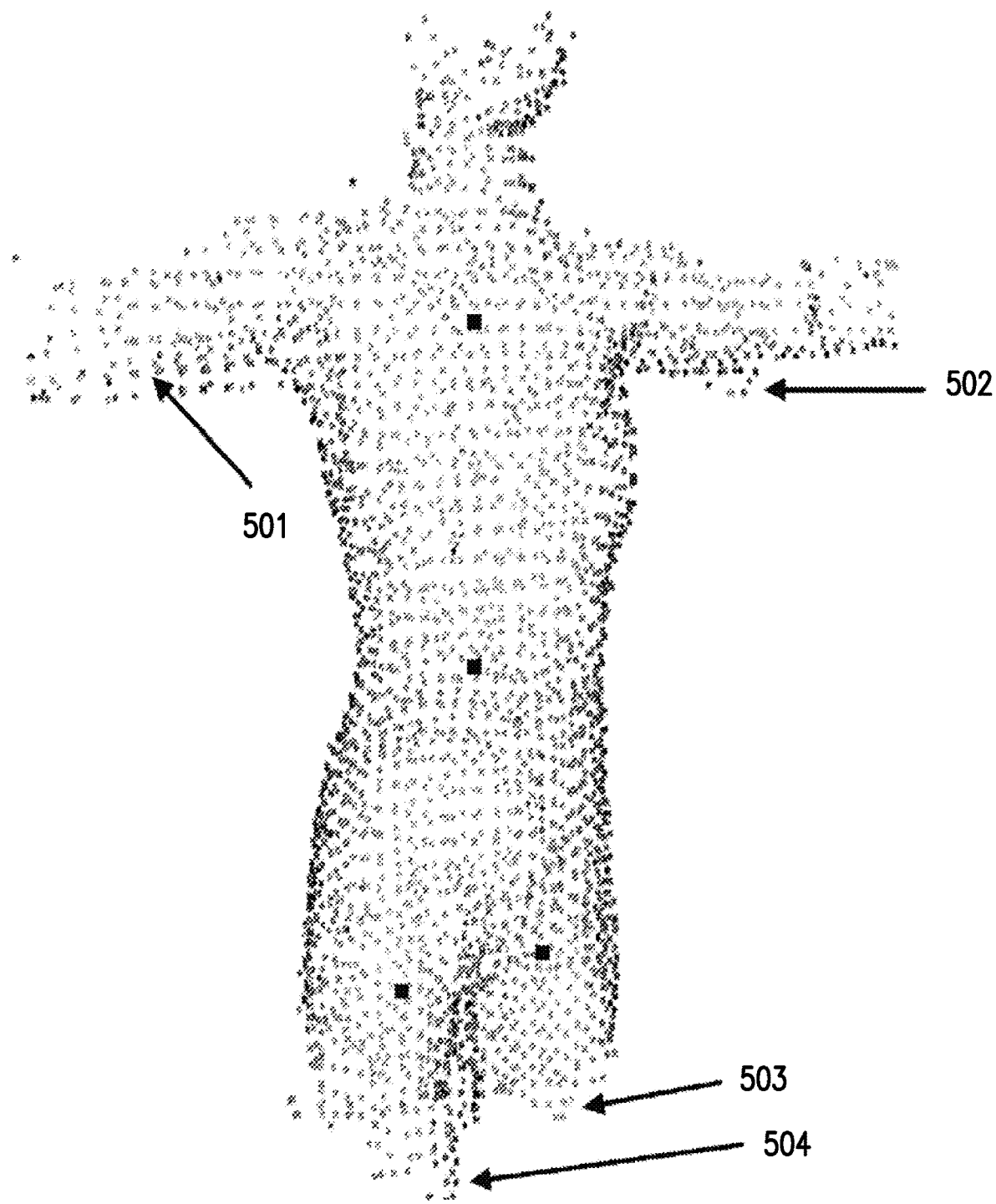
FIG. 5 shows an example dataset of a scanned subject before and after cleanup.
Figure 5:
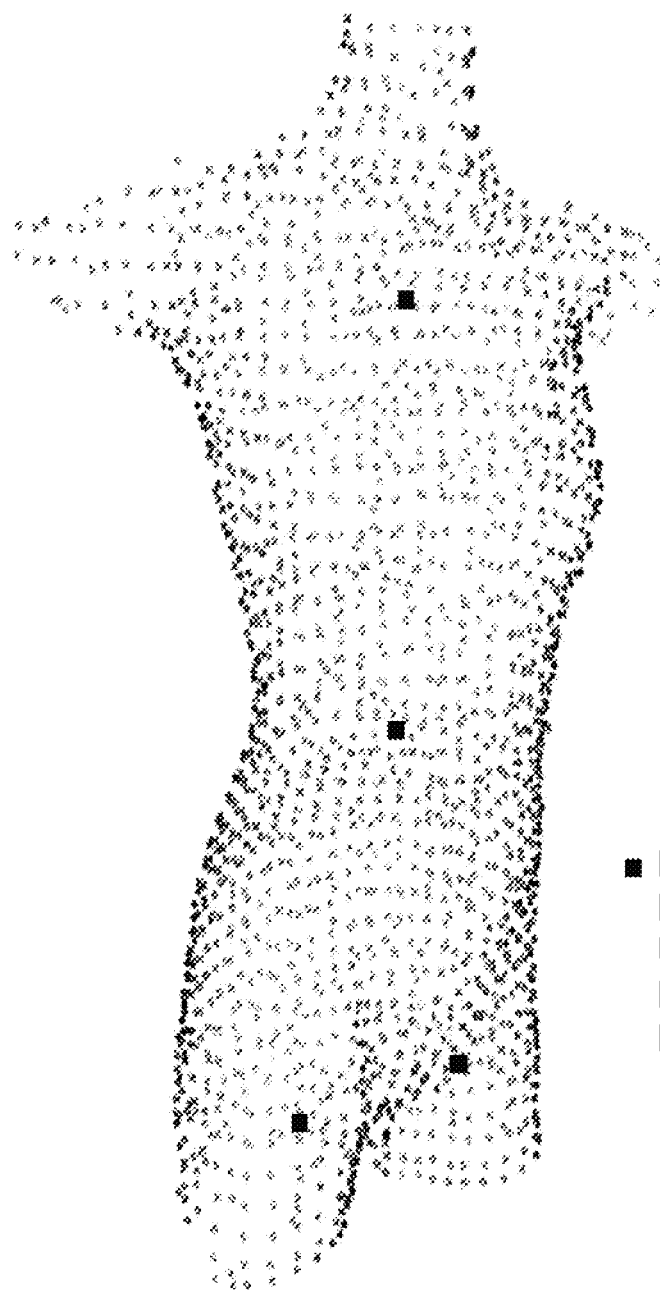
Figure 6:
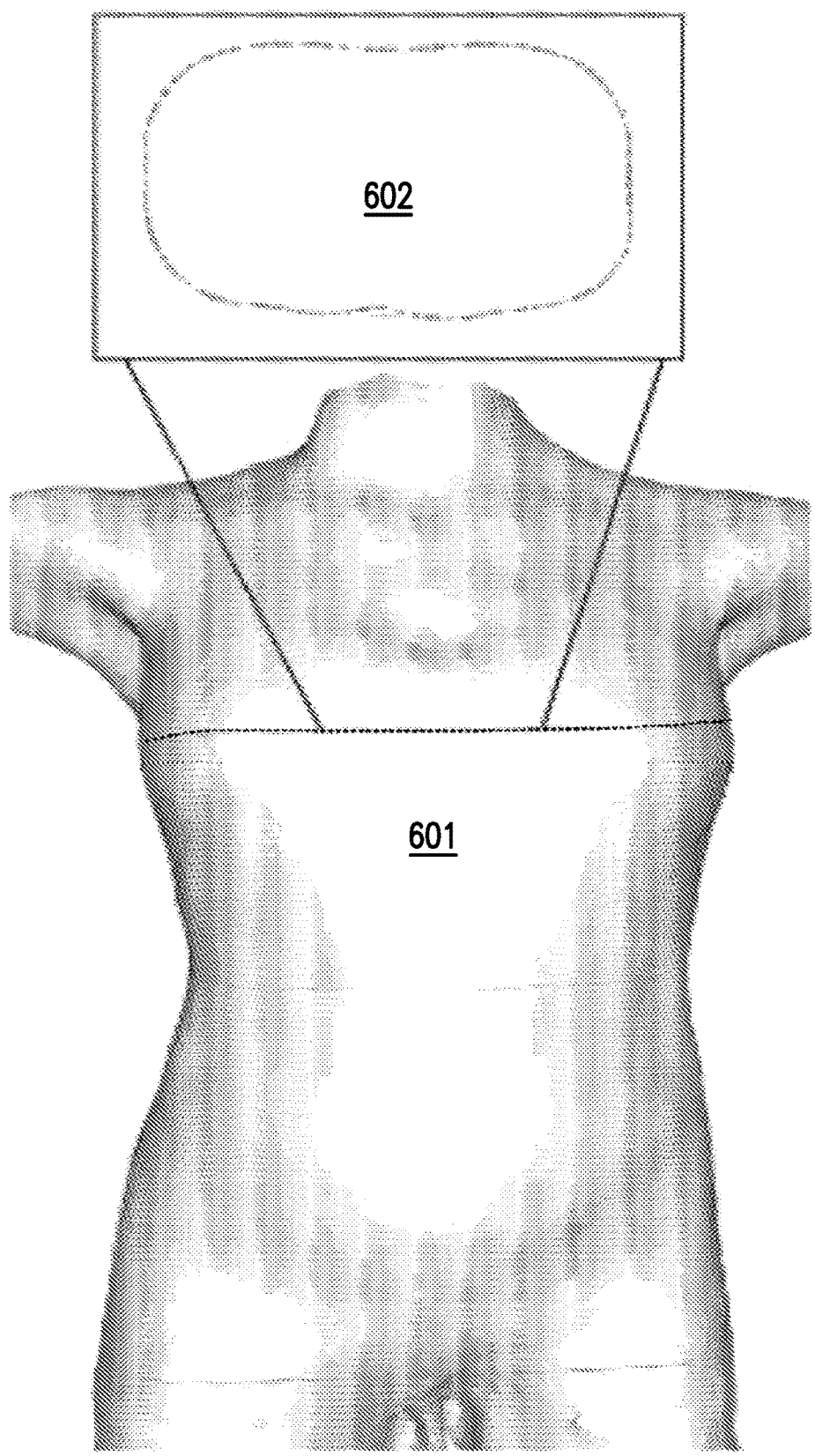
FIG. 6 shows an example triangle mesh of a reconstructed surface of the user.

FIG. 5 shows an example dataset (e.g., point cloud) of a reconstructed surface of a scanned subject (e.g., the user 101, etc.) before and after cleanup. Black boxes indicate locations of inner markers used for hidden point removal. Areas 501-504 show outlier data points (e.g. noise, etc.) data points that are removed after the described cleanup process. Returning to FIG. 2, measure data/information may be determined and/or extracted from a triangle mesh (and/or any other representation) of the user 101. The modeling module 113 may determine and/or extract measurements by slicing a triangle mesh at a given slice x value to determine/compute the circumference at that height. The modeling module 113 may determine/compute intersection points of each triangle with the plane at x=slice x using linear interpolation between vertices that lie on either side of the slice value. The modeling module 113 may, for example, use Graham's scan and/or a similar algorithm to determine/compute the ordered convex hull of the sliced set of points. The modeling module 113 may determine/compute the path length between points as the estimated circumference measurement. As described, the modeling module 113 may extract/determine the circumference measurement (e.g., equivalent to wrapping a soft tape measure around the body and keeping the tape measure level to the ground, etc.). FIG. 6 shows an example triangle mesh 601 of the user 101. A slice 602 of the triangle mesh 601 is shown at approximately chest height. Additionally, a list of adjacent triangles may be built for each vertex of the triangle mesh relative to a surface length of the user 101. For example, the mesh may indicate an inherent start point and an end point, by which a geodesic path along the surface of the mesh between those two points may be calculated. In an aspect, the start point, as well as the end point, may be indicated by the user 101. For example, the user 101 may select two (e.g., "2") points on the mesh so that the user device 102 may determine the surface length between the two selected points as an interactive custom length measurement process. In another aspect the start point, as well as the end point, may be pre-defined for a particular body measurement of a particular portion of the user's 101 body (e.g., a shoulder landmark point to an elbow landmark point may define the length of an upper arm). For example, an iteration may encompass the list of adjacent triangles within the mesh so that an intersection between each side of a triangle and the plane may be computed. This computation may continue until an intersecting triangle is determined. For example, in order to ensure that the direction of the iteration is traveling towards the end point, a dot product between the vector correspondent to the intersecting triangle point and a search direction vector may be checked. In the instance wherein a new intersection point is determined between the triangle and the plane, the intersection point may be added as the next point in the surface length path, from which point the iteration continues on from to determine the next intersection point. It is understood that the iteration may continue, and may be considered to be complete at the point wherein the end point may ultimately be determined. It is understood that the determined surface length may be utilized to convert a path along the surface of the mesh into a length that allows for a measure to be made that may consider each concavity disposed within the surface, as they may exist. For example, measuring the distance along the user's shoulder blades.

Figure 7:
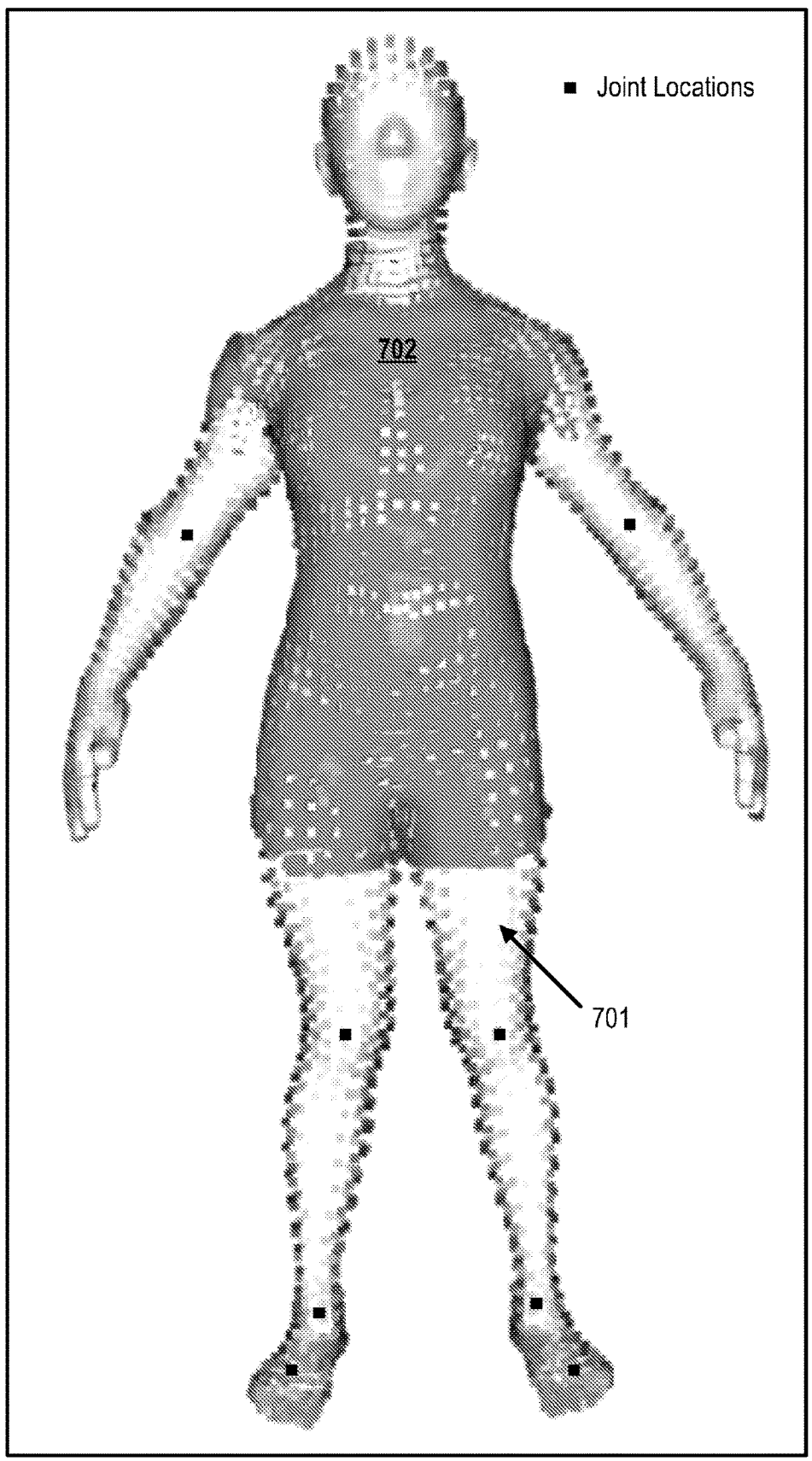
FIG. 7 shows an example torso scan used to determine a full-body representation of a user.

The modeling module 113 may transform a partial scan (e.g., depth images depicting a portion of the user 101, etc.) to a full representation/avatar of the user 101. Given a parametric full-body model, the modeling module 113 may optimize global orientation, translation, pose, and/or shape parameters to find the optimal set of body model parameters that describe the user's body shape and size. The modeling module 113 may minimize the distance between corresponding joint positions in the body model and the marker locations estimated from depth image data (e.g., shoulders, the center of the torso, upper legs, ankles, knees, elbows etc.) to coarsely align a model skeleton. For example, in the case where scan markers are automatically detected upon the surface of the user's 101 body, the joint positions associated with the body model may be projected to the visible surface of the avatar mesh from the perspective of the camera of the user device 102 before the optimization routine is performed so that the distances between corresponding joints may be minimized. After skeleton alignment, the modeling module 113 may optimize global orientation, translation, pose, and/or shape parameters of a full-body model to align a template mesh surface to the depth image data (e.g., scan data, etc.). The modeling module 113 may minimize distances between body model mesh vertices and a dataset (e.g., point clouds, etc.) by determining/computing a correspondence set between vertices in the mesh and closest points in the dataset and minimizing distances between corresponding points. The modeling module 113 may discard any body model vertices that are outside of a portion of the body of the user 101 from the correspondence set. The modeling module 113 may constrain model height by penalizing the delta between range in a vertical axis of the body model vertex locations and the user's height. The user's height information may be provided by the user or estimated from a full-body depth image of the user. FIG. 7 shows an example partial scan (e.g., a torso scan, etc.) used to determine a full-body representation/avatar, for example, of the user 101. A full-body avatar 701 (light grey) is fitted to a torso scan 702 (dark grey) and joint locations (indicated by black squares).

To improve the accuracy of shapes associated with each scanned appendage of the user 101, depicted in a full-body representation of the user 101, the modeling module 113 may extract a silhouette from images captured during the scanning process and further minimize the distance between the extracted silhouette and projected silhouette from a morphed template mesh. To improve the modeling accuracy, the body-model vertices that are outside of the scanned portion of the user's body may also be discarded during the parametric body model fitting process to avoid erroneously constraining the body model in areas where no scan data exists. In the instance wherein ankle joints may be detected in the scan, the disposition of the floor may be assumed to be underneath the detected ankle joints by running a plane segmentation on each of the points of the point clouds detected below the detected ankle joints. Using an assumption that the user is standing on the floor while performing a scan, the bottom of the avatar model's feet may be further constrained to be at the floor level of the detected plane.

In an aspect, the modeling module 113 may cause a forward-facing, upright 3D avatar to be projected to the imaging device 106 (e.g., the user device 102, etc.) plane based on an indication of gravity direction received from the user device 102. The modeling module 113 may leverage information indicating that the user 101 is facing the imaging device 106 (e.g., the user device 102, etc.) during the collection of depth image data (e.g., during a full-body snapshot capture, etc.).

Figure 8:
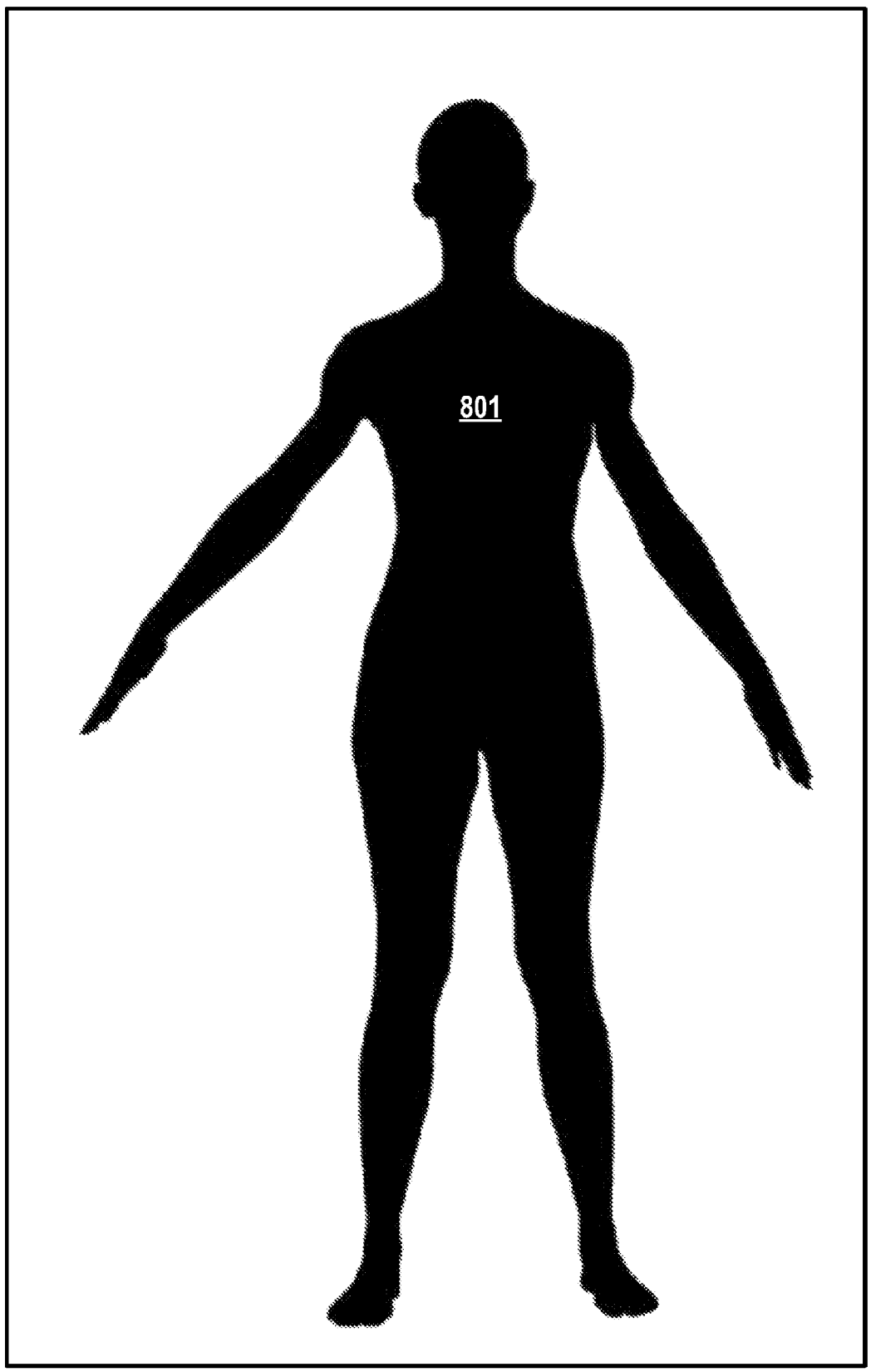
FIG. 8 shows an example silhouette of a full-body representation of a user.
Figure 9A:
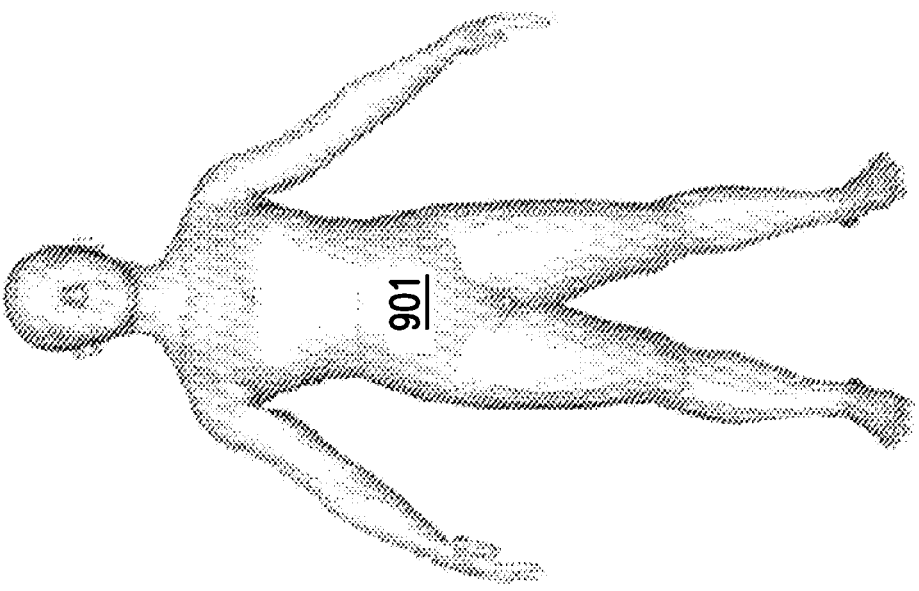
FIGS. 9A-9B shows an example of a full-body interactive representation of a user.
Figure 9B:
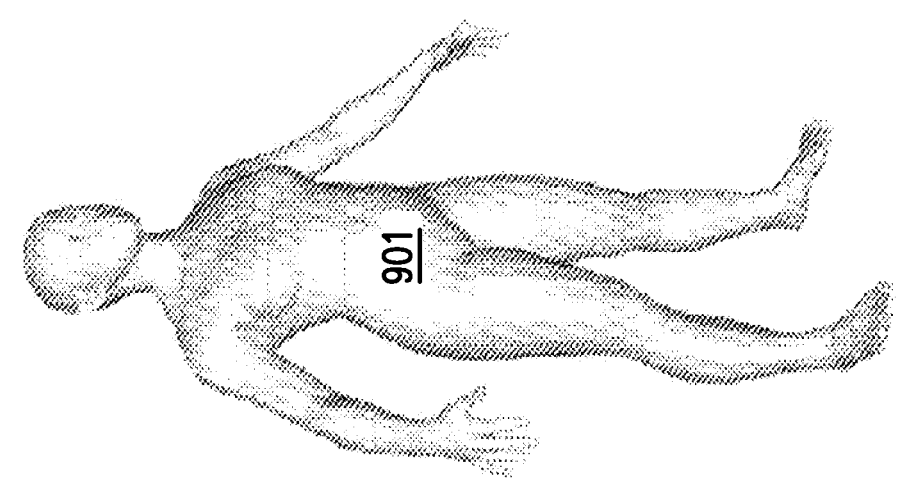

FIG. 8 shows an example silhouette of a full-body representation/avatar. The computing device 104 may cause the user device 102 to display a silhouette 801 of a full-body representation/avatar, for example, of the user 101 determined from image data. Measurement data may be associated with one or more portions of a silhouette of a full-body representation/avatar and/or the full-body representation/avatar. FIGS. 9A-9B show an example interactive full-body representation/avatar. A full-body representation/avatar 901 of, for example, the user 101. The full-body representation/avatar 901 may be displayed with measurements 902 that correspond to one or more portions of the full-body representation/avatar 901. FIG. 9A shows a front-facing view of the full-body representation/avatar 901. The full-body representation/avatar 901 may be rotated and/or otherwise manipulated, for example, by interacting with a portion of the full-body representation/avatar 901 that is displayed via the interface module 105 (FIG. 2) and/or the like. For example, FIG. 9B shows a rotated view of the full-body representation/avatar 901. Interaction with the full-body representation/avatar 901, for example, via the interface module 105 (FIG. 2) may include hovering over or selecting a measurement from a list of measurements (e.g., the measurements 902). Interaction with the measurements 902 may cause highlighted measurement to be visualized on the full-body representation/avatar 901. For example, a selection of and/or interaction with a waist metric of the measurements 902 may cause a curve to be drawn outlining the waist of the full-body representation/avatar 901, along with circumference information (e.g., shown as corresponding circumference lines on the full-body representation/avatar 901, etc.). As another example, interaction with the full-body representation/avatar 901 may cause highlighted measurement to be visualized on the full-body representation/avatar 901. For example, a selection of and/or interaction with a curve outlining the waist of the full-body representation/avatar 901 (e.g., shown as circumference lines on the full-body representation/avatar 901, etc.) may cause a waist metric of to be displayed (e.g., a waist metric of the measurements 902, etc.).

Figure 10:
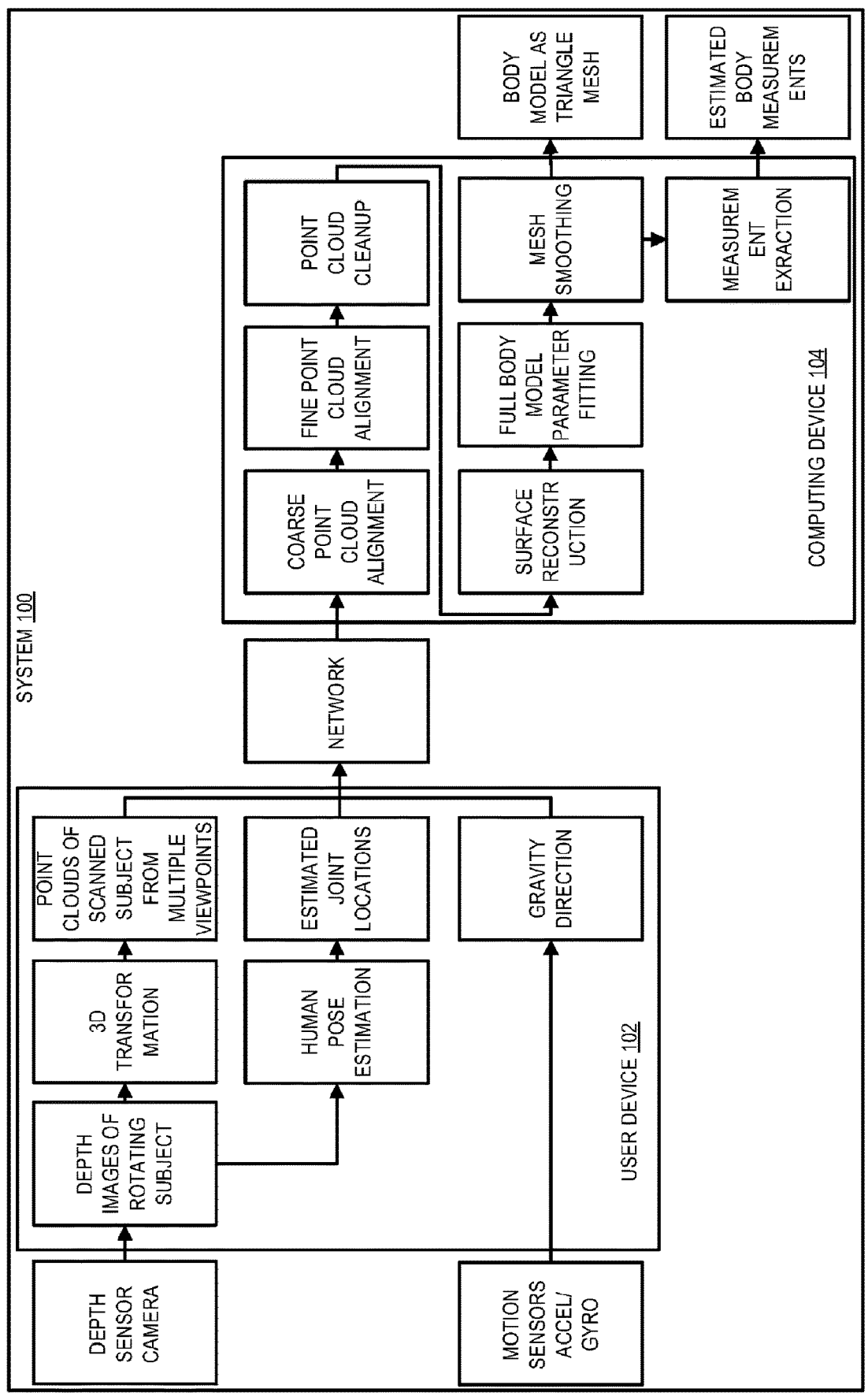
FIG. 10 shows a block diagram summary of example methods.
Figure 11:
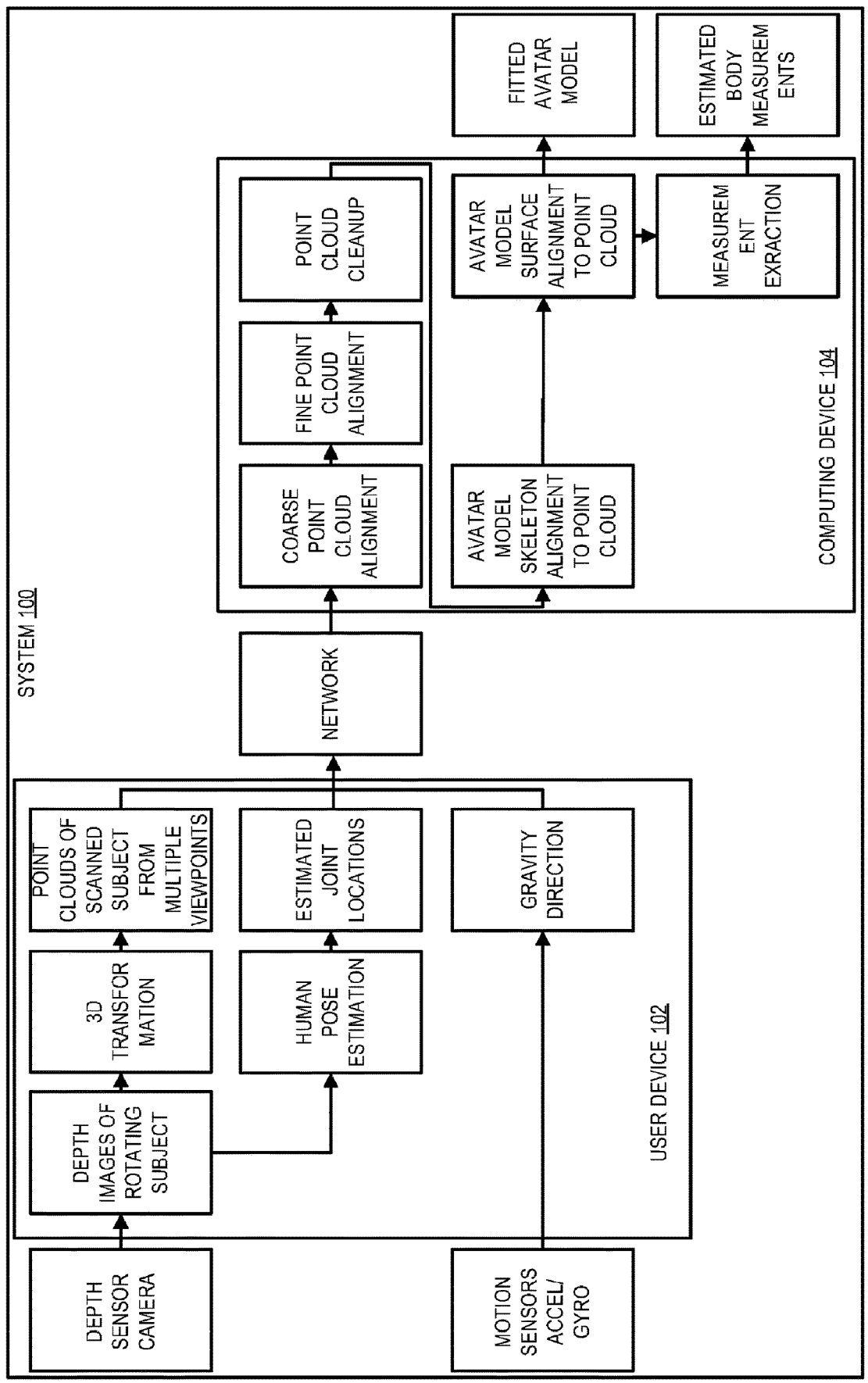
FIG. 11 shows a block diagram summary of example methods.

FIGS. 10-11 are block diagrams that summarize the methods described herein for representing a user based on the system 100. For example, FIG. 10 illustrates the system 100, whereby a portion of the user's 101 body (e.g., a torso area) may be captured and utilized to generate an estimation of measurements pertaining to the rest of the user's 101 body. In another example, FIG. 11, illustrates the system 100, whereby a plurality of portions of the user's 101 body (e.g., arm(s), leg(s), etc.) may be captured by the user device 102. The user device 102 may then align each of the portions of the user's 101 body in reference to an avatar model to generate a combined avatar model pertaining to the whole of the user's 101 body, which may be derived from the plurality of the scanned portions of the user's 101 body. While the system illustrated in FIG. 10 may inherently result in a less accurate estimation of measurements pertaining to the rest of the user's 101 body, the system illustrated in FIG. 10 also may not require the user 101 to complete as many scans as may be required by the system illustrated in FIG. 11.

Figure 12:
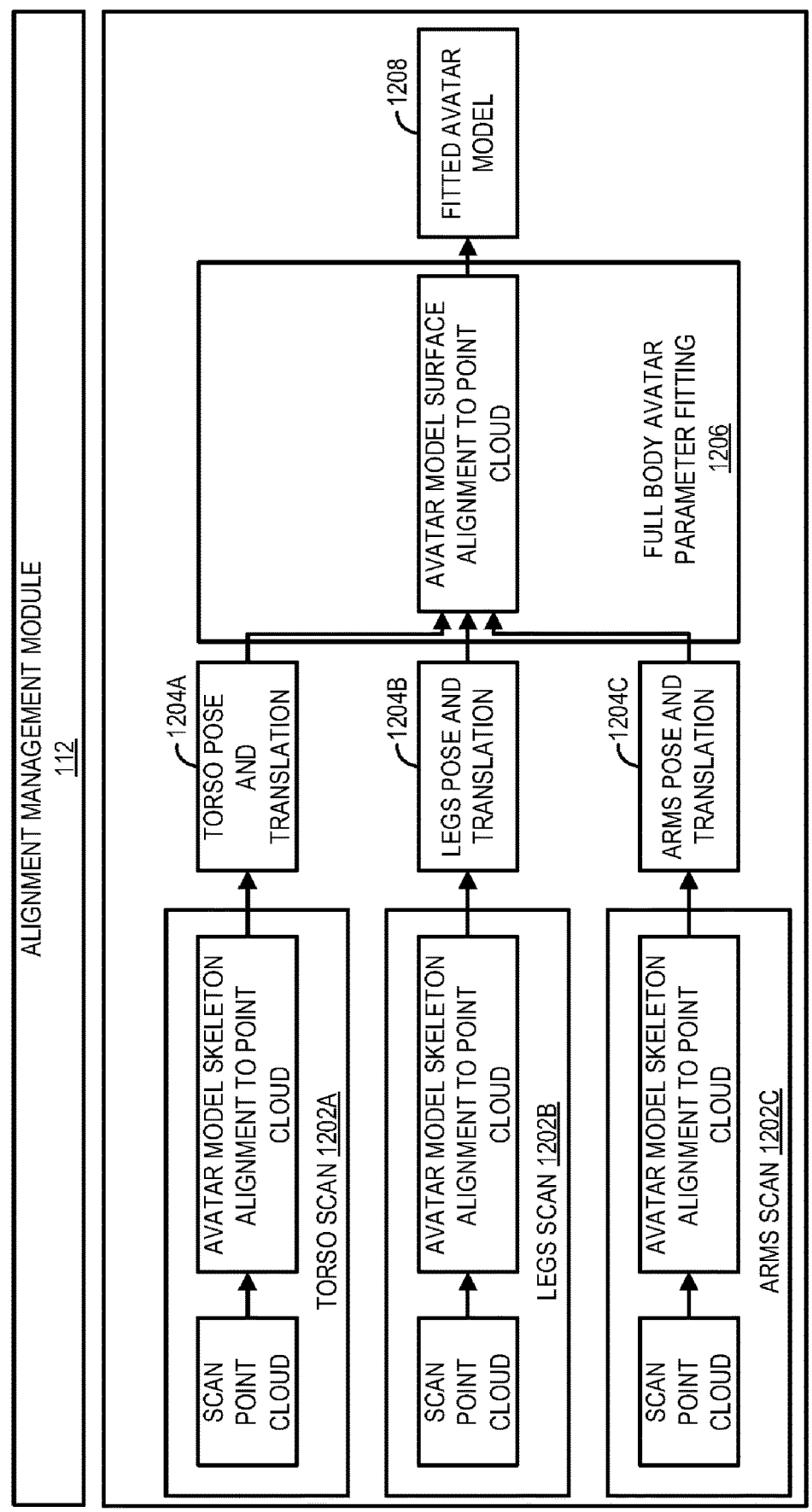
FIG. 12 shows an example alignment process.

FIG. 12 shows a block diagram of an example alignment process performed by the alignment management module 112 to jointly align a plurality of scanned portions of the user's 101 body to generate a combined avatar model. The alignment process may include independently estimating the user's 101 pose and translation in each of the plurality of scans so that any changes associated with the position and stance of the user 101 between each scan may be accounted for. The alignment process may include estimating the pose and translation for each dataset by coarsely aligning the skeleton of a parametric body model to the corresponding joint data points, of each dataset of a plurality of datasets determined for each of one or more portions of the body of a subject (e.g., a scanned object, the user 101, etc.) by minimizing the distance between each model skeleton joint and the corresponding joint in the scan dataset as determined, for example, by a pose detection machine learning model 107 running on the user device 102. Skeleton alignment of datasets (e.g., point clouds, images, etc.) may be followed by surface alignment of the datasets based on minimizing the distances between corresponding data points on the surface of the avatar body model mesh and the scanned surface of the user's 101 body. The surface alignment process may be jointly performed to fit a single set of body shape parameters that minimizes alignment losses between the model and all scan inputs of the user 101 by assuming that the user's 101 body shape did not change between scans. The surface alignment process may allow for varying pose and translation for each scan by additionally enforcing separate skeleton alignment constraints for the varying set of joint positions in each scan dataset. In an aspect, this may be done for varying portions of the user's 101 body so that a unified avatar model may ultimately be constructed that best fits each of the scan data inputs.

For example, at 1202A-1202C, the alignment management module 112 may scan a portion of the user's 101 body, separately, to determine a plurality of point clouds, images, joint locations, and/or body silhouettes for the specific scanned portion. For example, a separate scan may be made of the user's 101 torso, leg(s), and/or arm(s), respectively. It is understood, however, that the scan of the user 101 may be of the user's 101 entire body, rather than separately scanned portions. The alignment management module 112 may align an avatar model skeleton with the scan data from a portion or whole of the user's 101 body. For example, the alignment management module 112 may align the avatar model skeleton with a point cloud correspondent to the user's 101 scanned torso at 1202A. For example, the alignment management module 112 may align the avatar model skeleton with a point cloud correspondent to the user's 101 scanned leg(s) at 1202B. For example, the alignment management module 112 may align the avatar model skeleton with a point cloud correspondent to the user's 101 scanned arm(s) at 1202C. From each of the individually scanned portions of the user's 101 body, pose and translation information may be determined at 1204A-1204C. For example, pose and translation information may be determined at 1204A for the user's 101 torso based on the torso scan at 1202A. For example, pose and translation information may be determined at 1204B for the user's 101 leg(s) based on the leg(s) scan at 1202B. For example, pose and translation information may be determined at 1204C for the user's 101 arm(s) based on the arm(s) scan at 1202C. In consideration of each of the determined pose and translation information 1204A-1204C, the alignment management module 112 may jointly optimize the collective body shape information 1204A-1204C to determine an optimal set of parameters for a full body avatar, representative of a torso, leg(s), and arm(s) at 1206 (i.e., combining each of the individually scanned body part of the user 101 so that the user device 102 may generate the full body avatar based on each individually scanned body part of the user 102). Based on the determined full body avatar, a fitted avatar model may be output to the user 101 at 1208. In an aspect, the alignment management module 112 may normalize the respective pose and translation for each of the scans upon the output of the fitted avatar model at 1208.

Figure 13:
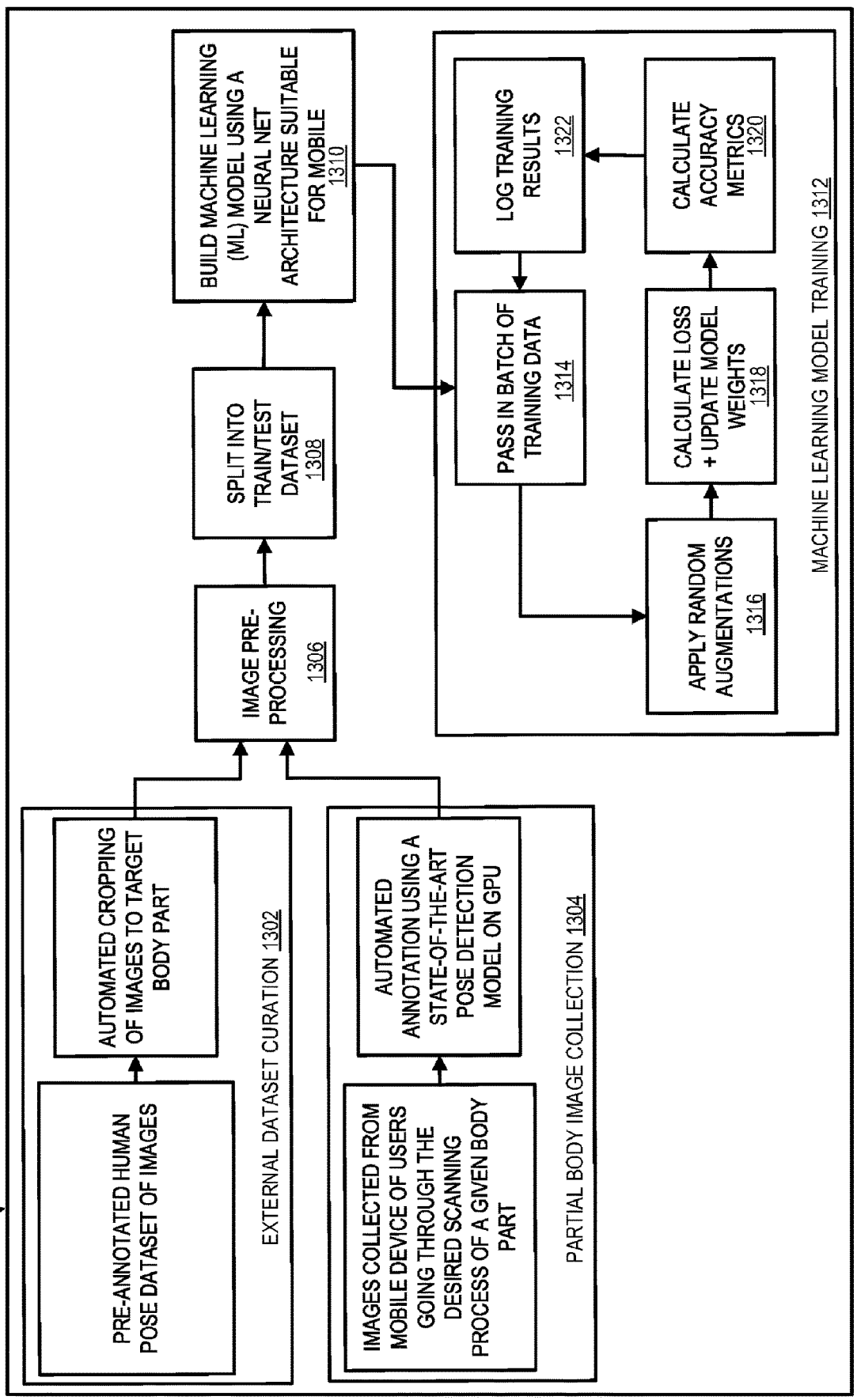
FIG. 13 shows an example machine learning system.

FIG. 13 shows an example of a system for machine learning 1300 for scanning a portion of the user's 101 body. The machine learning model that is employed as a part of the system 100 supports the guidance the user device 102 may provide to the user 101 as a part of the scan of the user's 101 body. The machine learning model may be conditioned specifically for specific body parts of the user 101. However, it is understood that that machine learning model may also be conditioned to consider the entirety of the user's 101 body as a singular entity as well. The system 1300 may consider an external dataset curation 1302 and a partial body image collection 1304 as datasets of information to begin pre-processing an image at 1306. For example, the external dataset curation 1302 may include images cropped at an image size greater than a predetermined pixel value for the user 101 (e.g., image size greater than 400×400px), as well as an automated cropping of images to a target body part. It is understood that the system 1300 may utilize images cropped for a plurality of users as well. For example, the partial body image collection 1304 may include images collected from the user device 102 during the scan of the user's 101 body, as well as an automated annotation utilizing the pose detection model. It is understood that the machine learning system 1300 may utilize images collected from a plurality of user devices as well. The images collected in the pre-processing step 1306 may be split into a dataset at 1308. It is understood that the dataset determined at 1308 may be used to train and/or test the functionality of the system 1300.

A machine learning model may be built at 1310 utilizing a neural net architecture suitable for the mobile functionality of the user device 102. It is understood that the neural net architecture may be suitable for any functionality of the user device 102 further than mobile capabilities. It is further understood that the machine learning model may be built based on the dataset determined at 1308. The machine learning model may supply training, and/or testing, data that may be necessary to enable the training of the machine learning model as a part of a machine learning process at 1312. For example, a batch of the training data may be passed along at 1314. The training data may allow for the machine learning training process 1312 to apply random augmentations to the training data at 1316. The machine learning training process 1312 may calculate the loss and/or update the machine learning model weights at 1318. Based on the determined model weights, the machine learning training process 1312 may calculate accuracy metrics at 1320. The accuracy metrics may be logged at 1322. The machine learning training process 1312 may pass the training results to add to the training data collected at 1314. It is understood that through the machine learning training process 1312, the system 100 may predict an increasingly accurate avatar model skeleton, for example. It is also understood that through the machine learning training process 1312, the system 100 may generate increasingly accurate joint location predictions from streamed images captured during the scan of a portion, or entirety, of the user's 101 body.

Figure 14:
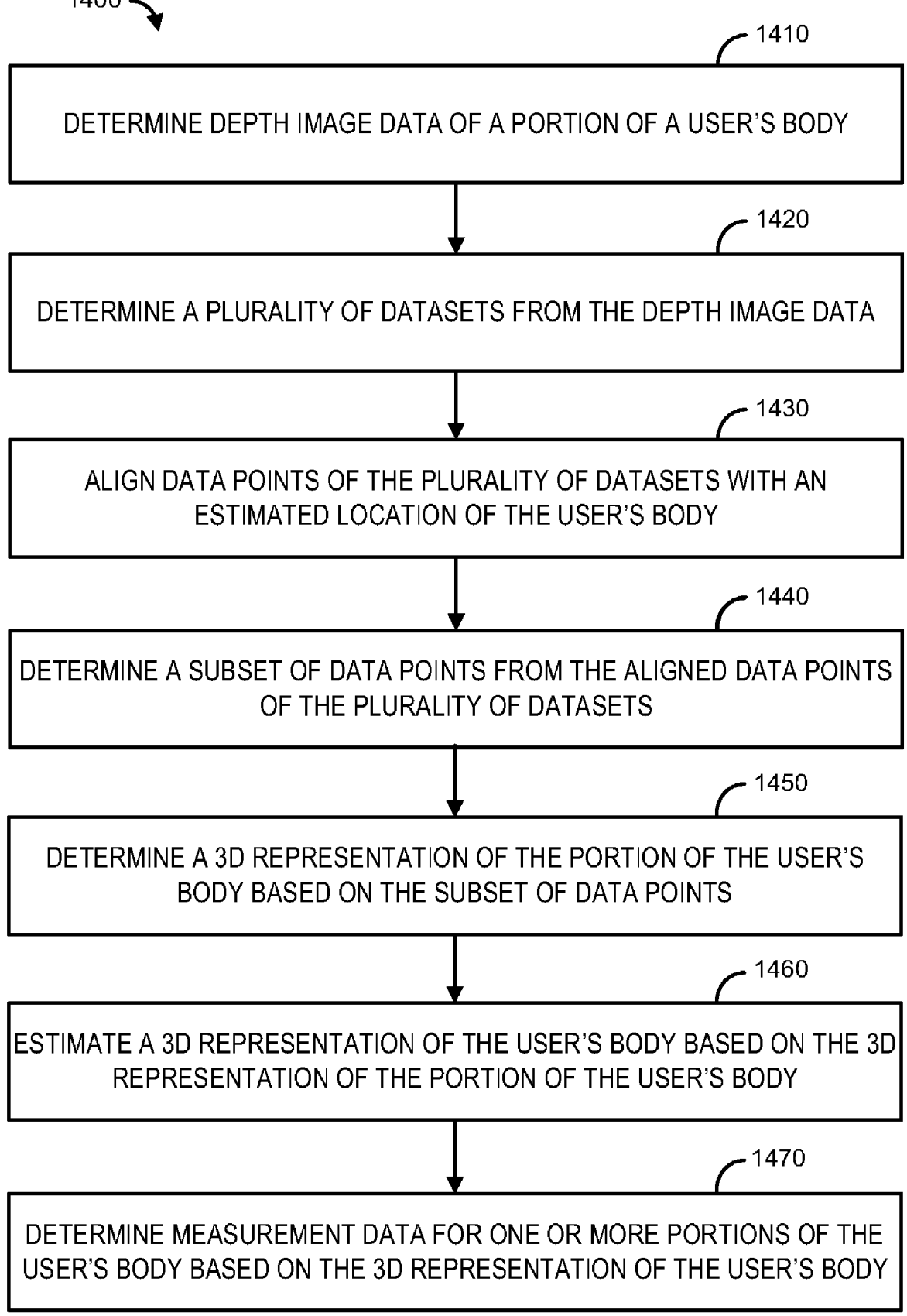
FIG. 14 shows a flowchart of a method for representing a user.

FIG. 14 is a flowchart of an example method 1400 for representing a user. High-resolution depth sensors and/or the like configured with a user device (e.g., a mobile device, a smart device, an image capturing device, a computing device, etc.) may be used to accurately capture the full-body shape and contours of the human body. The methods described herein enable a simple user experience of rotating in front of a static camera and/or depth sensor of the user device. Since the human body is low in visible features (due to smooth curvature and uniform texture), the methods described include a novel alignment process that leverages knowledge of user behavior during the scan. Based on a partial scan of a user's body, the parameters for a full-body model of the user's body may be determined and a full-body representation of a user may be output and/or displayed.

At 1410, determining, depth image data associated with one or more portions of a user's body. For example, a computing device (e.g., a server, a cloud device, a network device, etc.) may determine the depth image data. Determining the depth image data may include receiving the depth image data from a user device (e.g., a mobile device, a smart device, an image capturing device, a computing device, etc.). Collecting the depth image data from the user device may include determining the direction of gravity using the sensing devices on the user device. The sensing devices may include an accelerometer, a gyroscope, and/or an orientation sensing device.

The direction of gravity determined by the user device may be determined when the user device is in a stationary position or a non-stationary position. The sensing devices may be used to determine when the direction of gravity changes significantly, denoting that the user device is no longer stationary. The depth image data collection may be aborted by user device motion. The stationary position may include a stationary position in front of the user's body, wherein the front of the user's body is within a field of view of the user device. The depth image data may be based on a plurality of images, wherein each image of the plurality of images may be associated with a different viewpoint of a plurality of viewpoints of the user's body rotated about a fixed axis.

At 1420, determining for each portion of the one or more portions of the user's body, based on the depth image data, a plurality of datasets, wherein each dataset of the plurality of datasets comprises one or more data points. The one or more data points of each of the plurality of datasets may indicate a location on a surface of a portion of the one or more portions of the user's body. The one or more data points of each of the plurality of datasets may include one or more Cartesian coordinates of three-dimensional (3D) space. A dataset may include a point cloud.

At 1430, aligning the one or more data points, of each dataset of the plurality of datasets for each portion of the one or more portions of the user's body, with a data point indicative of an estimated location on the user's body. Aligning the one or more data points, of each of the plurality of datasets for each portion of the one or more portions of the user's body, with the data point indicative of the estimated position of the user's body may include: performing, based on estimated rotation parameters determined from the estimated position of the user's body, a coarse alignment of the one or more data points, of each of the plurality of datasets for each portion of the one or more portions of the user's body; and performing a fine registration of the coarsely aligned one or more data points of each of the plurality of datasets for each portion of the one or more portions of the user's body based on minimizing distances between corresponding data points of overlapping datasets of the plurality of datasets. The estimated rotation parameters may be determined based on joint estimation.

Performing the coarse alignment of the one or more data points may include aligning a vertical axis associated with the one or more data points with a direction of gravity, wherein an indication of the direction of gravity is received from a user device.

Aligning the one or more data points, of each dataset of the plurality of datasets for each portion of the one or more portions of the user's body, with the data point indicative of the estimated location on the user's body may be based on an assumed constant rate of rotation associated with the user about an indicated gravity direction through a center of the user's body. The indicated gravity direction may be received from a user device. Determining the center of the user's body may be based on density-based clustering and least-squares fitting on a horizontal slice of a representation of a torso of the user's body.

At 1440, determining, for the aligned one or more data points of each dataset of the plurality of datasets for each portion of the one or more portions of the user's body, a subset of the one or more data points. For example, determining the subset of the one or more data points for the aligned one or more data points of each dataset of the plurality of datasets for each portion of the one or more portions of the user's body may include determining, for each of the plurality of datasets for each portion of the one or more portions of the user's body, which data points to discard or de-weight as lying away from the true surface of the user's body.

Determining the subset of the one or more data points for the aligned one or more data points of each dataset of the plurality of datasets for each portion of the one or more portions of the user's body may be, for example, based on density-based clustering and hidden point removal. The subset may exclude at least one data point of the one or more data points that are not visible from the inside of a representation of the user's body.

Determining the subset of the one or more data points for the aligned one or more data points of each dataset of the plurality of datasets for each portion of the one or more portions of the user's body may include discarding and/or de-weighting at least one data point of the one or more data points based on a distance from a location of the data point to an estimated surface of the user's body satisfying a threshold. The subset may include data points of the one or more data points that have not been discarded and/or de-weighted.

Determining the subset of the one or more data points for the aligned one or more data points of each dataset of the plurality of datasets may include discarding at least one data point of the one or more data points based on a similarity metric between each sequential pair of datasets of the plurality of datasets.

At 1450, determining, based on the subset of the one or more data points for the aligned one or more data points of each dataset of the plurality of datasets for each portion of the one or more portions of the user's body, a three-dimensional (3D) representation of the one or more portions of a user's body.

At 1460, estimating, based on the 3D representation of the one or more portions of the user's body, a 3D representation of the user's body. The 3D representation of the user's body may include a silhouette texture map, skeleton structure, joint locations, skinning weights, a static model, a dynamic model, an animation, and/or a video representation of the user's body The 3D representation of the user may include the set of parameters defining the user's body shape and size in a parametric model of a human body.

At 1470, determining, based on the 3D representation of the user's body, measurement data for each portion of the one or more portions of the user's body. The method 1400 may also include determining, based on principal component analysis on sequential datasets from the plurality of datasets for each portion of the one or more portions of the user's body, a direction of rotation associated with the user.

The method 1400 may also include determining, based on a partial scan of the user's body, parameters for the 3D representation of the user's body. The 3D representation of the user's body may include a full-body model of the user's body. Determining the parameters may include: minimizing distances between a surface of a parametric full-body model and data points of each dataset of the plurality of datasets for each portion of the one or more portions of the user's body, and minimizing distances between joint locations estimated from each dataset of the plurality of datasets for each portion of the one or more portions of the user's body and the parametric full-body model.

The method 1400 may also include: constraining the height of the parametric full-body model to height information received via a user device or height information estimated from a full-body image of the user, and minimizing asymmetries and sharpness in a 3D mesh representation of the user's body generated from the parametric full-body model.

The method 1400 also include: causing display of the 3D representation of the user's body and one or more interactive elements associated with the one or more portions of the user's body. For example, the computing device and/or an application associated with the computing device and/or the user device may send data indicating the 3D representation of the user's body and one or more interactive elements associated with the one or more portions of the user's body to the user device and cause the user device to display the 3D representation of the user's body and one or more interactive elements associated with the one or more portions of the user's body. Based on an interaction with an interactive element of the one or more interactive elements associated with a portion of the one or more portions of the user's body, the user device may be caused to display of at least a portion of the measurement data associated with the portion of the one or more portions of the user's body.

Figure 15:
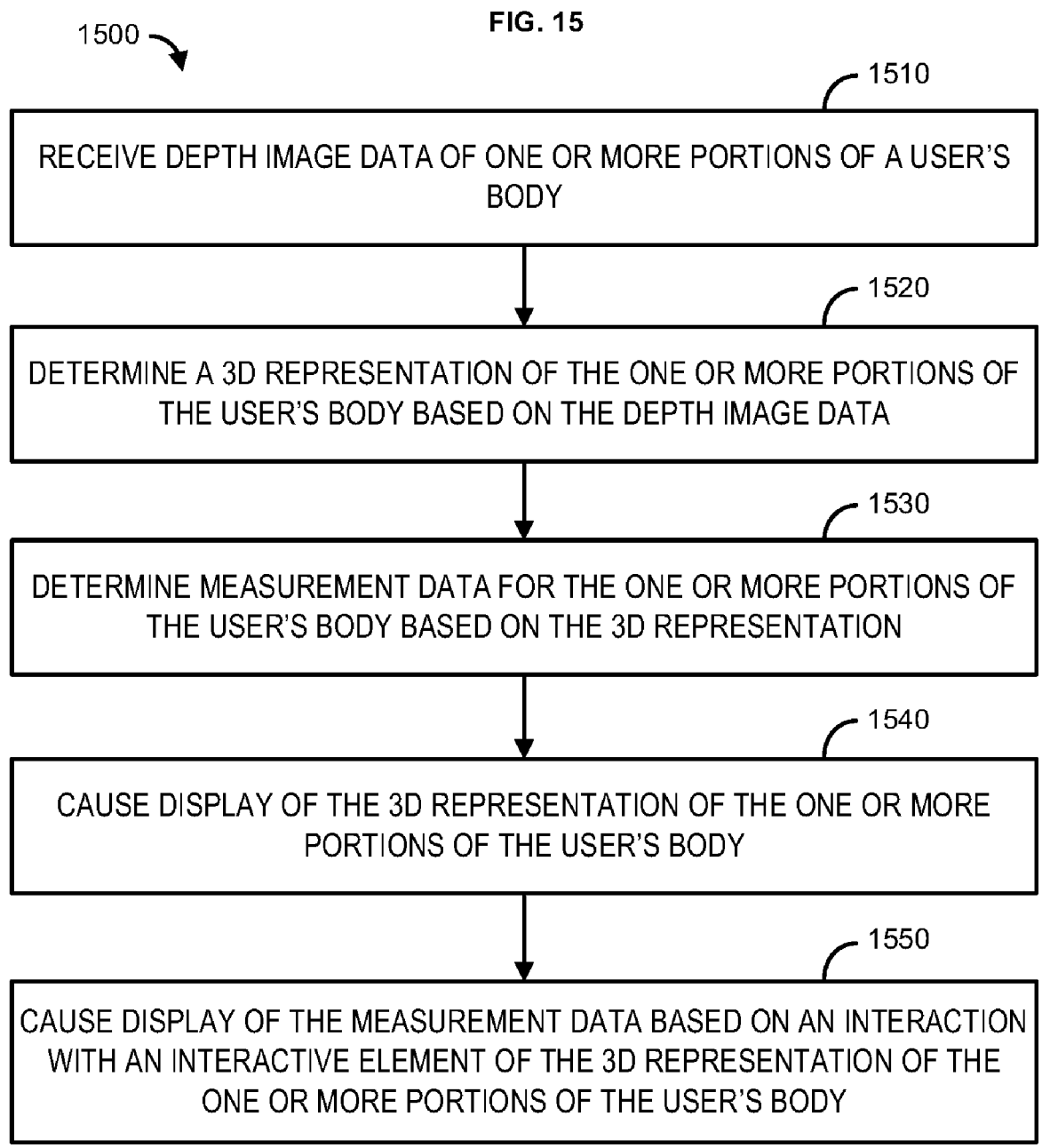
FIG. 15 shows a flowchart of a method for representing a user.

FIG. 15 is a flowchart of an example method 1500 for representing a user. High-resolution depth sensors and/or the like configured with a user device (e.g., a mobile device, a smart device, an image capturing device, a computing device, etc.) may be used to accurately capture the full-body shape and contours of the human body. The methods described herein enable a simple user experience of rotating in front of a static camera and/or depth sensor of the user device. Since the human body is low in visible features (due to smooth curvature and uniform texture), the methods described include a novel alignment process that leverages knowledge of user behavior during the scan.

At 1510, receiving depth image data associated with one or more portions of a user's body. For example, a computing device (e.g., a server, a cloud device, a network device, etc.) may receive the depth image data from a user device (e.g., a mobile device, a smart device, an image capturing device, a computing device, etc.). Receiving the depth image data from the user device may include a direction of gravity determined by a sensing device associated with the user device. The sensing device may include at least one of an accelerometer, a gyroscope, and an orientation sensing device. The direction of gravity may be continuously estimated throughout the data collection process, and the data collection (e.g. scanning process) may be aborted/restarted when the direction of gravity changes from the estimated direction at the beginning of the scan.

The direction of gravity determined by the sensing device may be determined when the user device is in a stationary position. The stationary position may include a stationary position in front of the user's body, wherein the front of the user's body is within a field of view of the user device. The depth image data may be based on a plurality of images, wherein each image of the plurality of images may be associated with a different viewpoint of a plurality of viewpoints of the user's body rotated about a fixed axis.

For example, the user device may be placed upright on a level surface with the one or more imaging sensors facing the user such that the user is within a field-of-view of the user device. The user may rotate, for example, rotate 360 degrees about a fixed point/axis, in front of the user device as the user device captures depth images of the user at various viewpoints.

At 1520, determining, based on the depth image data, a three-dimensional (3D) representation of the one or more portions of the user's body. The depth images may be converted to a plurality of data sets, such as a plurality of 3D point clouds. The plurality of datasets may be aligned, cleaned up, and converted to a 3D model of the user's body.

At 1530, determining, based on the 3D representation of the one or more portions of the user's body, measurement data for each portion of the one or more portions of the user's body. For example, measurement data may be extracted from the 3D model.

At 1540, causing display of the 3D representation of the one or more portions of the user's body. The 3D representation of the one or more portions of the user's body may include one or more interactive elements associated with the one or more portions of the user's body. The 3D representation of the one or more portions of the user's body may be displayed via an interactive interface of the user device. The computing device may cause the user device to display the 3D model.

At 1550, causing, based on an interaction with an interactive element of the one or more interactive elements associated with a portion of the one or more portions of the user's body, display of at least a portion of the measurement data associated with the portion of the one or more portions of the user's body.

Figure 16:
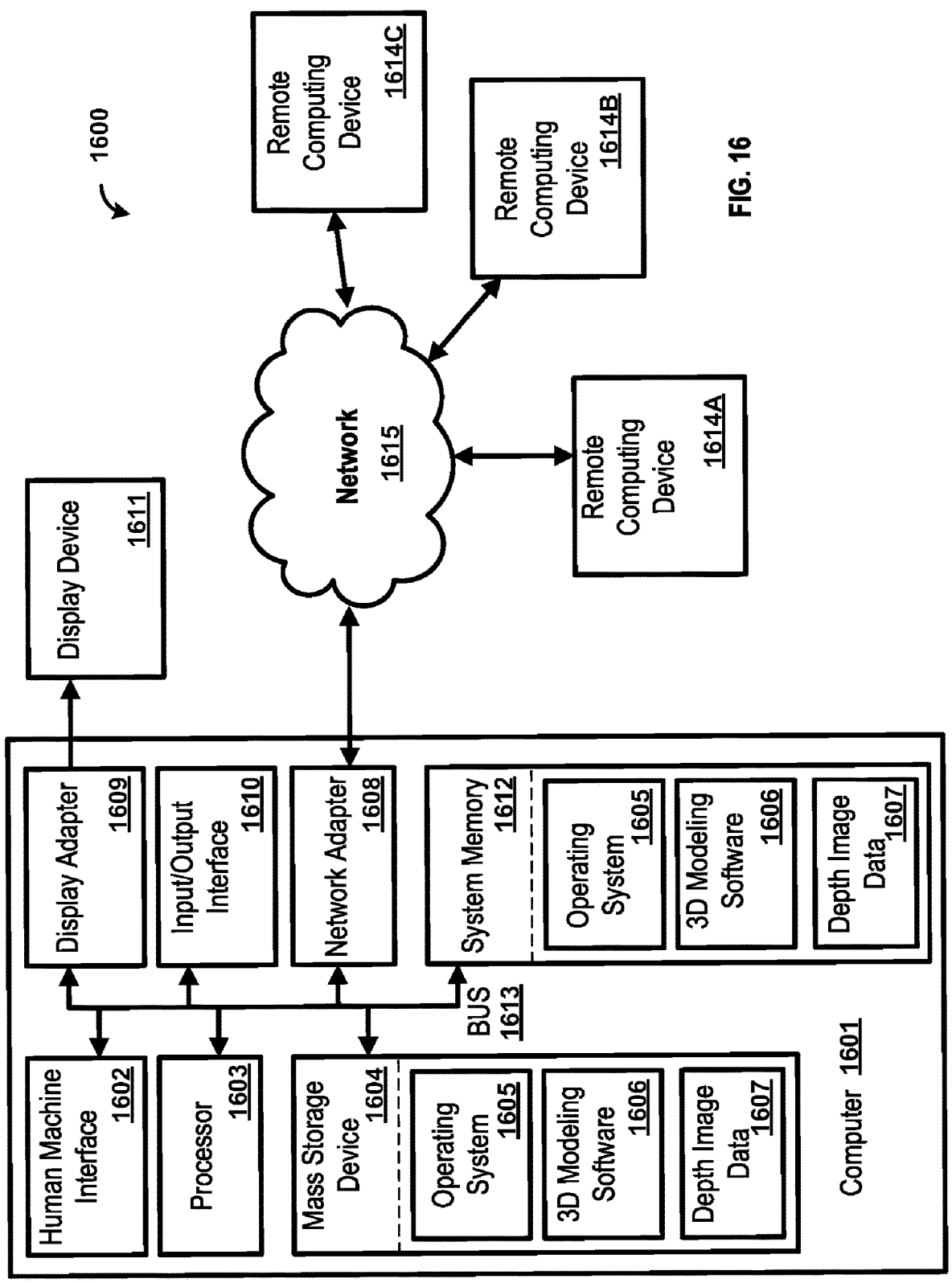
FIG. 16 shows a block diagram of an example computing device for implementing example methods.

FIG. 16 shows a system 1600 for representing a user. Any device/component described herein may be a computer 1601 as shown in FIG. 16.

The computer 1601 may comprise one or more processors 1603, a system memory 1612, and a bus 1613 that couples various components of the computer 1601 including the one or more processors 1603 to the system memory 1612. In the case of multiple processors 1603, the computer 1601 may utilize parallel computing.

The bus 1613 may comprise one or more of several possible types of bus structures, such as a memory bus, memory controller, a peripheral bus, an accelerated graphics port, and a processor or local bus using any of a variety of bus architectures.

The computer 1601 may operate on and/or comprise a variety of computer-readable media (e.g., non-transitory). Computer-readable media may be any available media that is accessible by the computer 1601 and comprises non-transitory, volatile, and/or non-volatile media, removable and non-removable media. The system memory 1612 has computer-readable media in the form of volatile memory, such as random access memory (RAM), and/or non-volatile memory, such as read-only memory (ROM). The system memory 1612 may store data such as depth image data 1607 and/or program modules such as operating system 1605 and 3D modeling software 1606 that are accessible to and/or are operated on by the one or more processors 1603.

The computer 1601 may also comprise other removable/non-removable, volatile/non-volatile computer storage media. The mass storage device 1604 may provide non-volatile storage of computer code, computer-readable instructions, data structures, program modules, and other data for the computer 1601. The mass storage device 1604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 1604. An operating system 1605 and 3D modeling software 1606 may be stored on the mass storage device 1604. One or more of the operating system 1605 and 3D modeling software 1606 (or some combination thereof) may comprise program modules and the 3D modeling software 1306. Depth image data 1607 may also be stored on the mass storage device 1604. Depth image data 1607 may be stored in any of one or more databases known in the art. The databases may be centralized or distributed across multiple locations within the network 1615.

A user may enter commands and information into the computer 1601 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1603 via a human-machine interface 1602 that is coupled to the bus 1613, but may be connected by other interface and bus structures, such as a parallel port, game port, an IEEE 1394 Port (also known as a Firewire port), a serial port, network adapter 1608, and/or a universal serial bus (USB).

A display device 1611 may also be connected to the bus 1613 via an interface, such as a display adapter 1609. It is contemplated that the computer 1601 may have more than one display adapter 1609 and the computer 1601 may have more than one display device 1611. A display device 1611 may be a monitor, an LCD (Liquid Crystal Display), a light-emitting diode (LED) display, a television, a smart lens, a smart glass, and/or a projector. In addition to the display device 1611, other output peripheral devices may comprise components such as speakers (not shown) and a printer (not shown) which may be connected to the computer 1601 via Input/Output Interface 1610. Any step and/or result of the methods may be output (or caused to be output) in any form to an output device. Such output may be any form of visual representation, including, but not limited to, textual, graphical, animation, audio, tactile, and the like. The display 1611 and computer 1601 may be part of one device, or separate devices.

The computer 1601 may operate in a networked environment using logical connections to one or more remote computing devices 1614A,B,C. A remote computing device 1614A,B,C may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 1601 and a remote computing device 1614A,B,C may be made via a network 1615, such as a local area network (LAN) and/or a general wide area network (WAN). Such network connections may be through a network adapter 1608. A network adapter 1608 may be implemented in both wired and wireless environments. Such networking environments are conventional and commonplace in dwellings, offices, enterprise-wide computer networks, intranets, and the Internet.

Application programs and other executable program components such as the operating system 1605 are shown herein as discrete blocks, although it is recognized that such programs and components may reside at various times in different storage components of the computing device 1601, and are executed by the one or more processors 1603 of the computer 1601. An implementation of 3D modeling software 1606 may be stored on or sent across some form of computer-readable media. Any of the disclosed methods may be performed by processor-executable instructions embodied on computer-readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:
1. A method comprising:
capturing a sequence of depth images as a user self-rotates in a rotation sequence in a field of view of a single, static imaging device, wherein each depth image in the sequence of depth images is associated with one or more portions of a user's body that is in view of the single, static imaging device at a single respective snapshot in time, wherein a user's pose varies relative to the static imaging device over the sequence of depth images as the user rotates their body in the rotation sequence defining a variable user pose and a user's position varies relative to the static imaging device over the sequence of depth images as the user rotates their body in the rotation sequence defining a variable user position;
determining for each portion of the one or more portions of the user's body, based on the sequence of depth images, a plurality of datasets, wherein each dataset of the plurality of datasets comprises a point cloud of one or more data points, wherein each point cloud corresponds to one depth image in the sequence of depth images;
aligning each point cloud of one or more data points for each portion of the one or more portions of the user's body with a data point indicative of an estimated location on the user's body, the data point indicative of the estimated location on the user's body corresponding to a specific body part of the user, wherein multiple point clouds are aligned with the one or more portions of the user's body, wherein aligning each point cloud further comprises:

estimating at least two joint locations of the user's body in each point cloud, the at least two joint locations comprising a pose estimation to track the variable user pose over the rotation sequence, aligning a vertical axis associated with the one or more data points with a direction of gravity, wherein an indication of the direction of gravity is received from a user device, estimating a center of rotation associated with the user in each point cloud after the aligning the vertical axis to track the variable user position over the rotation sequence, transforming time-sequential point clouds in the rotation sequence about the estimated center of rotation based on the pose estimation, and aligning the transformed time-sequential point clouds overlapping at least a portion of the user's body;

determining, for the aligned one or more data points of each dataset of the plurality of datasets for each portion of the one or more portions of the user's body, a subset of the one or more data points;

generating, after aligning multiple point clouds and determining the subset, based on the subset of the one or more data points for the aligned one or more data points of each dataset of the plurality of datasets for each portion of the one or more portions of the user's body, a three-dimensional (3D) representation of the one or more portions of a user's body;

estimating, based on the 3D representation of the one or more portions of the user's body, a 3D representation of the user's body; and determining, based on the 3D representation of the user's body, measurement data for each portion of the one or more portions of the user's body.

2. The method of claim 1, wherein determining the sequence of depth images comprises receiving the sequence of depth images from a user device, and wherein receiving the sequence of depth images is based on an estimated constant direction of gravity determined by a sensing device associated with the user device when the user device is in a stationary position.

3. The method of claim 2, wherein the stationary position comprises a stationary position in front of the user's body, wherein the one or more portions of the user's body is within a field of view of the user device.

4. The method of claim 1, wherein the sequence of depth images is based on a plurality of images, wherein each image of the plurality of images is associated with a different viewpoint of a plurality of viewpoints of the user's body.

5. The method of claim 1, wherein the one or more data points of each of the plurality of datasets indicate a location on a surface of a portion of the one or more portions of the user's body.

6. The method of claim 1, wherein aligning each point cloud for each portion of the one or more portions of the user's body, with the data point indicative of the estimated position of the user's body comprises:

performing, based on estimated rotation parameters determined from the estimated position of the user's body, a coarse alignment of the one or more data points, of each of the plurality of datasets for each portion of the one or more portions of the user's body; and performing a fine registration of the coarsely aligned one or more data points of each of the plurality of datasets for each portion of the one or more portions of the user's body based on minimizing distances between corresponding data points of overlapping datasets of the plurality of datasets.

7. The method of claim 6, wherein the estimated rotation parameters are based on joint estimation.

8. The method of claim 1, further comprising determining the center of the user's body rotation based on density-based clustering and least squares fitting on a horizontal slice of a representation of a torso of the user's body.

9. The method of claim 1, wherein determining the subset of the one or more data points for the aligned one or more data points of each dataset of the plurality of datasets for each portion of the one or more portions of the user's body comprises discarding at least one data point of the one or more data points based on a distance from a location of the data point to an estimated surface of the user's body satisfying a threshold, wherein the subset comprises data points of the one or more data points that have not been discarded.

10. The method of claim 1, wherein determining the subset of the one or more data points for the aligned one or more data points of each dataset of the plurality of datasets for each portion of the one or more portions of the user's body comprises discarding at least one data point of the one or more data points based on density-based clustering and hidden point removal, wherein the at least one data point of the one or more data points is not visible from inside of a representation of the user's body.

11. The method of claim 1, wherein determining the subset of the one or more data points for the aligned one or more data points of each dataset of the plurality of datasets comprises discarding at least one data point of the one or more data points based on a similarity metric between each sequential pair of datasets of the plurality of datasets.

12. The method of claim 1, wherein the measurement data for each portion of the one or more portions of the user's body comprises a plurality of anthropometric measurements.

13. The method of claim 1, further comprising determining, based on principal component analysis on sequential datasets from the plurality of datasets for each portion of the one or more portions of the user's body, a direction of rotation associated with the user.

14. The method of claim 1, further comprising determining, based on a partial scan of the user's body, parameters for the 3D representation of the user's body, wherein the 3D representation of the user's body comprises a full-body model of the user's body.

15. The method of claim 14, wherein determining the parameters comprises:

minimizing distances between a surface of a parametric full-body model and data points of each dataset of the plurality of datasets for each portion of the one or more portions of the user's body; and minimizing distances between joint locations estimated from each dataset of the plurality of datasets for each portion of the one or more portions of the user's body and the parametric full-body model.

16. The method of claim 15, further comprising:

constraining a height of the parametric full-body model to height information received via a user device or estimated from a full-body image of the user's body, wherein a base height of the parametric full-body model is at a ground level associated with feet of the parametric full-body model;

constraining a boundary of the full-body model to match a silhouette image, wherein the silhouette image is extracted from images of the user's body; and minimizing asymmetries and sharpness in a 3D mesh representation of the user's body generated from the parametric full-body model.

17. The method of claim 1, wherein the one or more portions of the user's body may be one or more of: one or more legs of the user, one or more arms of the user, or a torso of the user.

18. The method of claim 1, further comprising:
guiding, based on feedback from the user device, the user to perform a scan of the user's body, wherein the feedback may be based on one or more of: a rotation rate, a pose, positioning of the user's body, placement of the user device, a start time of the scan, or an end time of the scan.

19. The method of claim 1, wherein capturing depth images associated with one or more portions of a user's body further comprises capturing depth images of less than the entire user's body, wherein each dataset of the plurality of datasets comprises a point cloud of one or more data points of less than the entire user's body, the method further comprising:
fitting the point cloud of less than the entire user's body to a parametric full-body model,
wherein generating the three-dimensional (3D) representation further comprises applying the subset of the one or more data points for the aligned one or more data points of each dataset of the plurality of datasets for each portion of the one or more portions of the user's body to the parametric full-body model to generate a 3D representation of the user's complete body from a partial body scan.

20. The method of claim 1, wherein capturing depth images associated with one or more portions of a user's body further comprises:
conducting the capturing depth images, the determining a plurality of datasets comprising a point cloud of one or more data points, the aligning the one or more data points with a data point indicative of an estimated location on the user's body, and the determining a subset of the one or more data points on a first portion of the user's body that is not the user's full body to generate a first portion subset;
conducting the capturing depth images, the determining a plurality of datasets comprising a point cloud of one or more data points, the aligning each point cloud with a data point indicative of an estimated location on the user's body, and the determining a subset of the one or more data points on a second portion of the user's body that is not the user's full body to generate a second portion subset,
wherein the generating the three-dimensional (3D) representation further comprises combining the first portion subset and the second portion subset, wherein the three-dimensional (3D) representation reflects the first portion of the user's body and the second portion of the user's body, and wherein the three-dimensional (3D) representation is a full body avatar.

21. One or more non-transitory computer-readable media storing processor-executable instructions that, when executed by at least one processor, cause the at least one processor to:
determine, a sequence of depth images as a user self-rotates in a rotation sequence in a field of view of a single, static imaging device, wherein each depth image in the sequence of depth images is associated with one or more portions of a user's body that is in view of the single, static imaging device at a single respective snapshot in time, wherein a user's pose varies relative to the single, static imaging device over the sequence of depth images as the user rotates their body in the rotation sequence defining a variable user pose and a user's position varies relative to the single, static imaging device over the sequence of depth images as the user rotates their body in the rotation sequence defining a variable user position;
determine for each portion of the one or more portions of the user's body, based on the sequence of depth images, a plurality of datasets, wherein each dataset of the plurality of datasets comprises a point cloud of one or more data points corresponding to one depth image in the sequence of depth images;
align each point cloud of one or more data points, for each portion of the one or more portions of the user's body with a data point indicative of an estimated location on the user's body, the data point indicative of the estimated location on the user's body corresponding to a specific body part of the user, wherein multiple point clouds are aligned with the one or more portions of the user's body, wherein aligning each point cloud further comprises:
estimating at least two joint locations of the user's body in each point cloud, the at least two joint locations comprising a pose estimation to track the variable user pose over the rotation sequence,
aligning a vertical axis associated with the one or more data points with a direction of gravity, wherein an indication of the direction of gravity is received from a user device,
estimating a center of rotation associated with the user in each point cloud after the aligning the vertical axis to track the variable user position over the rotation sequence,
transforming time-sequential point clouds in the rotation sequence about the estimated center of rotation based on the pose estimation, and
aligning the transformed time-sequential point clouds overlapping at least a portion of the user's body;
determine, for the aligned one or more data points of each dataset of the plurality of datasets for each portion of the one or more portions of the user's body, a subset of the one or more data points:
generate, after aligning multiple point clouds and determining the subset, based on the subset of the one or more data points for the aligned one or more data points of each dataset of the plurality of datasets for each portion of the one or more portions of the user's body, a three-dimensional (3D) representation of the one or more portions of a user's body;
estimate, based on the 3D representation of the one or more portions of the user's body, a 3D representation of the user's body; and
determine, based on the 3D representation of the user's body, measurement data for each portion of the one or more portions of the user's body.

22. A method comprising:
determining, based on a three-dimensional (3D) representation of one or more portions of a user's body generated based on alignment of multiple point clouds associated with the one or more portions of the user's body from depth image data captured by a single image capturing device positioned at a static position as the user self-rotates in a rotation sequence in a field of view of the single image capturing device, measurement data for each portion of the one or more portions of the user's body, wherein a user's pose varies relative to the single image capturing device over the sequence of depth images as the user rotates their body in the rotation sequence defining a variable user pose and a user's position varies relative to the single image capturing device over the sequence of depth images as the user rotates their body in the rotation sequence defining a variable user position, the alignment of multiple point clouds comprising aligning each point cloud comprising:

estimating at least two joint locations of the user's body in each point cloud, the at least two joint locations comprising a pose estimation to track the variable user pose over the rotation sequence, aligning a vertical axis associated with the one or more data points with a direction of gravity, wherein an indication of the direction of gravity is received from a user device, estimating a center of rotation associated with the user in each point cloud after the aligning the vertical axis to track the variable user position over the rotation sequence, transforming time-sequential point clouds in the rotation sequence about the estimated center of rotation based on the pose estimation, and aligning the transformed time-sequential point clouds overlapping at least a portion of the user's body;

causing display of the 3D representation of the one or more portions of the user's body, wherein the 3D representation of the one or more portions of the user's body comprises one or more interactive elements associated with the one or more portions of the user's body; and causing, based on an interaction with an interactive element of the one or more interactive elements associated with a portion of the one or more portions of the user's body, display of at least a portion of the measurement data associated with the portion of the one or more portions of the user's body.

* * * * *